US008861846B2

(12) United States Patent
Takeuchi et al.

(10) Patent No.: US 8,861,846 B2
(45) Date of Patent: Oct. 14, 2014

(54) IMAGE PROCESSING APPARATUS, IMAGE PROCESSING METHOD, AND PROGRAM FOR PERFORMING SUPERIMPOSITION ON RAW IMAGE OR FULL COLOR IMAGE

(75) Inventors: Satoru Takeuchi, Chiba (JP); Hiroaki Takahashi, Tokyo (JP); Teppei Kurita, Tokyo (JP); Tomonori Masuno, Tokyo (JP); Takefumi Nagumo, Kanagawa (JP); Yuhi Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 13/157,781

(22) Filed: Jun. 10, 2011

(65) Prior Publication Data

US 2011/0310302 A1 Dec. 22, 2011

(30) Foreign Application Priority Data

Jun. 17, 2010 (JP) ................................ P2010-138621

(51) Int. Cl.
*G06K 9/00* (2006.01)
*G06K 9/32* (2006.01)
*H04N 9/82* (2006.01)
*H04N 5/262* (2006.01)
*H04N 5/77* (2006.01)
*H04N 5/907* (2006.01)
*H04N 9/804* (2006.01)
*H04N 5/232* (2006.01)
*G06T 7/00* (2006.01)

(52) U.S. Cl.
CPC ........... *H04N 5/2625* (2013.01); *H04N 9/8227* (2013.01); *G06T 2207/10016* (2013.01); *H04N 5/772* (2013.01); *H04N 5/907* (2013.01); *H04N 9/8042* (2013.01); *H04N 5/23254* (2013.01); *H04N 9/8205* (2013.01); *G06T 7/0024* (2013.01)

USPC ............................ 382/165; 382/298; 382/299

(58) Field of Classification Search
CPC ............................ G06T 3/4076; G06T 3/4053
See application file for complete search history.

(56) References Cited

U.S. PATENT DOCUMENTS 7,379,612 B2 * 5/2008 Milanfar et al. .............. 382/254
7,477,802 B2 * 1/2009 Milanfar et al. .............. 382/299

(Continued)

FOREIGN PATENT DOCUMENTS

JP 2009-194700 8/2009
JP 2009-290827 12/2009

OTHER PUBLICATIONS

Vandewalle et al, Joint Demosaicing and Super-Resolution Imaging from a Set of Unregistered Aliased Images Digital Photography III, edited by Russel A. Martin, Jeffrey M. DiCarlo, Nitin Sampat, Proc. of SPIE-IS&T Electronic Imaging, SPIE vol. 6502, 65020A, 2007.*

(Continued)

*Primary Examiner* — Andrae S Allison
(74) *Attorney, Agent, or Firm* — Finnegan Henderson Farabow Garrett & Dunner LLP

(57) ABSTRACT

An image processing apparatus includes a superimposition processing unit that performs a blending process for a plurality of continuously captured images, wherein the superimposition processing unit is configured to selectively input luminance signal information of a RAW image or a full color image as a processing target image and perform a superimposition process, and performs a process for sequentially updating data that is stored in a memory for storing two image frames so as to enable superimposition of any desired number of images.

10 Claims, 15 Drawing Sheets

(56) References Cited

U.S. PATENT DOCUMENTS

| | | | |
|---|---|---|---|
| 7,646,938 B2* | 1/2010 | Berier et al. | 382/298 |
| 8,233,747 B2* | 7/2012 | Ali et al. | 382/299 |
| 2007/0071362 A1* | 3/2007 | Milanfar et al. | 382/299 |
| 2009/0046995 A1* | 2/2009 | Kanumuri et al. | 386/114 |
| 2010/0119176 A1* | 5/2010 | Ichihashi et al. | 382/300 |
| 2010/0254630 A1* | 10/2010 | Ali et al. | 382/300 |
| 2011/0182528 A1* | 7/2011 | Scherteler et al. | 382/274 |
| 2013/0114892 A1* | 5/2013 | Vandame | 382/162 |

OTHER PUBLICATIONS

Farsiu, Video-to-Video Dynamic Super-Resolution for Grayscale and Color Sequences, EURASIP Journal on Applied Signal Processing vol. 2006, Article ID 61859, pp. 1-15.*

* cited by examiner

FIG. 2

| R | G | R | G | R | G | R |
|---|---|---|---|---|---|---|
| G | B | G | B | G | B | G |
| R | G | R | G | R | G | R |
| G | B | G | B | G | B | G |
| R | G | R | G | R | G | R |
| G | B | G | B | G | B | G |
| R | G | R | G | R | G | R |

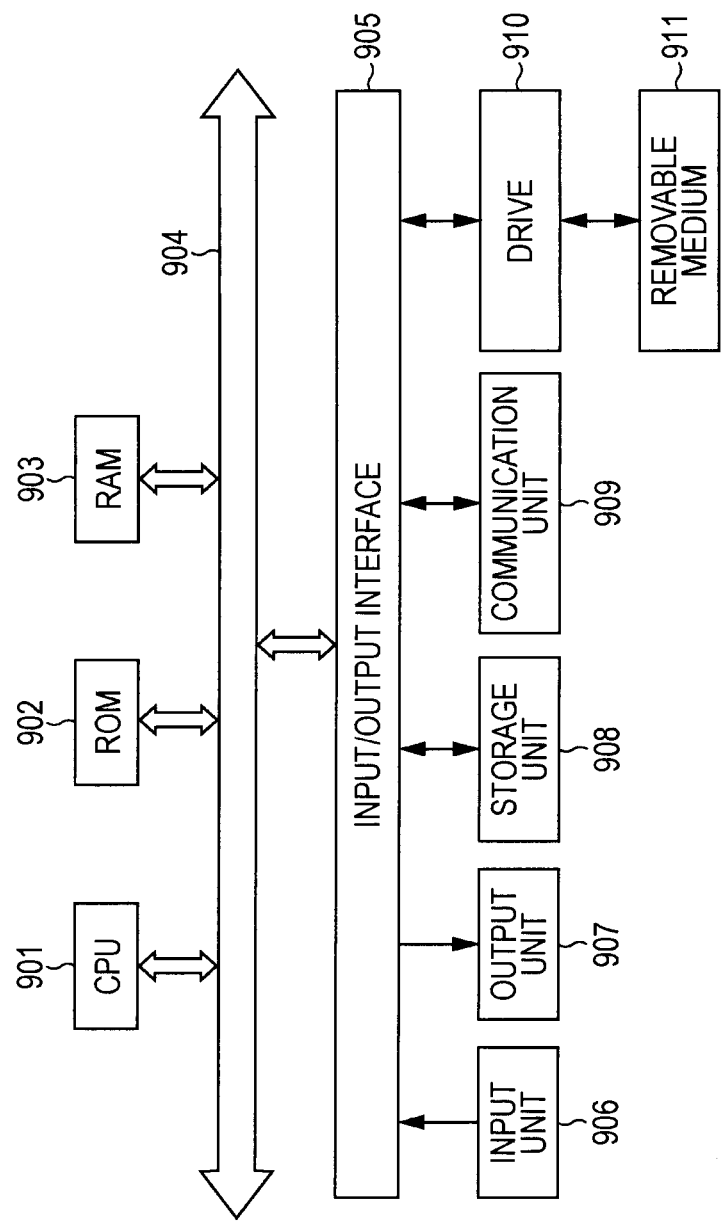

IMAGE PROCESSING APPARATUS, IMAGE PROCESSING METHOD, AND PROGRAM FOR PERFORMING SUPERIMPOSITION ON RAW IMAGE OR FULL COLOR IMAGE

BACKGROUND

The present disclosure relates to an image processing apparatus, an image processing method, and a program. In particular, the present disclosure relates to an image processing apparatus, an image processing method, and a program that perform processes for reducing noise in images and increasing the resolution of images.

In a case where image processing, such as an image noise reduction (NR) process, or a resolution increasing process, which is called, for example, a super resolution (SR) process that generates a high resolution image from a low resolution image, is to be performed, for example, processing in which a plurality of continually captured images containing the same subject are used is performed. Examples of the related art that discloses an image processing technology, such as noise reduction using a plurality of images, include Japanese Unexamined Patent Application Publication No. 2009-194700, and Japanese Unexamined Patent Application Publication No. 2009-290827.

In a case where the noise reduction process or the resolution increasing process is to be performed, effective noise reduction and increasing of resolution are realized by using many images. Therefore, for an apparatus that generates high-quality images, memories that store many images become necessary.

However, if an image processing apparatus is provided with many image storage memories, hardware becomes large, and the cost is increased. Therefore, a problem arises in that it is difficult for image-capturing devices for which there is a large demand for reduction in size, and low cost to be provided with such many memories.

Furthermore, in a case where noise reduction and increasing of resolution described above are to be performed in an image-capturing device, the following different images can become targets to be processed as images for the processing target:

(a) a RAW image that is generated by image-capturing elements, a so-called mosaic image formed of signals of pixels, of only specific color (for example, any one of RGB) corresponding to a color filter as a signal of each pixel, (b) a full color image in which a color signal of RGB or the like is set in all the pixels by a color interpolation process for a mosaic image.

However, since the structure of these image signals is different, in the related art, processing is performed by using an individual dedicated circuit depending on which one of the image signals (a) and (b) is made to be a processing target. That is, there is no art that discloses a specific structure in which processing is performed on the two different signals by applying one common circuit.

As to how a circuit for performing noise reduction and increasing of resolution on these two different image signals is to be decreased in size so as to reduce the cost has become a challenge.

SUMMARY

It is desirable to provide an image processing apparatus, an image processing method, and a program that enable noise reduction or a resolution increasing process by a superimposition process using a plurality of images to be realized by employing simplified hardware configuration.

It is also desirable to provide an image processing apparatus, an image processing method, and a program that enable noise reduction or a resolution increasing process to be realized by using a common circuit capable of processing both a RAW image and a full color image in an embodiment of the present disclosure.

According to an embodiment of the present disclosure, there is provided an image processing apparatus including: a superimposition processing unit configured to perform a blending process for a plurality of continuously captured images, wherein the superimposition processing unit is configured to selectively input luminance signal information of a RAW image or a full color image as a processing target image and perform a superimposition process, and performs a process for sequentially updating data that is stored in a memory for storing two image frames so as to enable superimposition of any desired number of images.

In an embodiment of the image processing apparatus according to the present disclosure, the superimposition processing unit may perform a process for overwriting and storing an image after the superimposition process in a portion of the memory and for using the superimposed image stored in the memory for next and subsequent superimposition processes.

In an embodiment of the image processing apparatus according to the present disclosure, the superimposition processing unit may store pixel value data corresponding to each of pixels of the RAW image in the memory and may perform a superimposition process based on the pixel value data corresponding to each of pixels of the RAW image in a case where the RAW image is a processing target, and may store luminance signal value data corresponding to each of pixels in the memory and performs a superimposition process based on luminance value data corresponding to each of pixels of a full color image in a case where the full color image is a processing target.

In an embodiment of the image processing apparatus according to the present disclosure, the superimposition processing unit may include a global motion vector calculation unit configured to calculate a global motion vector of a plurality of continuously captured images; a positioning processing unit configured to generate a motion compensated image in which a subject position of a reference image is positioned at a position of a key image in accordance with the global motion vector; a moving subject detection unit configured to obtain moving subject information on the basis of a pixel difference between corresponding pixels of the motion compensated image obtained as a result of positioning of the positioning processing unit and the key image; and a blending processing unit configured to blend the key image and the motion compensated image on the basis of the blending ratio based on the moving subject information so as to generate a superimposed image.

In an embodiment of the image processing apparatus according to the present disclosure, the moving subject detection unit may calculate, as moving subject information at a pixel unit, an α value indicating moving subject information on the basis of a pixel difference between corresponding pixels of the motion compensated image obtained as a result of the positioning of the positioning processing unit, and the key image, and the blending processing unit may decrease a blending ratio of the motion compensated image with regard to a pixel having a high probability of being a moving subject in accordance with the value of the α value, and may perform a blending process in which the blending ratio of the motion compensated image is set high with regard to a pixel having a low probability of being a moving subject.

In an embodiment of the image processing apparatus according to the present disclosure, the superimposition processing unit may include a resolution increase processing unit configured to perform a resolution increasing process for a processing target image, and the blending processing unit may perform superimposition of images whose resolution has been increased in the resolution increase processing unit.

In an embodiment of the image processing apparatus according to the present disclosure, the image processing apparatus may further include a global motion vector recording unit configured to store a global motion vector of an image, the global motion vector being calculated by the global motion vector calculation unit on the basis of a RAW image, and the superimposition processing unit may perform a superimposition process using a full color image as a processing target by using the global motion vector stored in the global motion vector recording unit.

In an embodiment of the image processing apparatus according to the present disclosure, when the blending processing unit performs N superimposition processes by using (N+1) still images as processing targets, the blending processing unit may perform an N-th superimposition process by using an (N−1)th superimposed image $mlt_{N-1}$, and an (N+1)th not-yet-superimposed image $frm_{N+1}$ in accordance with the following equations:

when $N$ is 2 or more, [Math. 1]

$$mlt_N = \frac{\alpha}{N+1} \times frm_{N+1} + \left(1 - \frac{\alpha}{N+1}\right) \times mlt_{N-1}, 0 \leq \alpha \leq 1$$

and, when $N$ is 1, $$mlt_1 = \frac{\alpha}{2} \times frm_2 + \left(1 - \frac{\alpha}{2}\right) \times frm_1, 0 \leq \alpha \leq 1$$

where $\alpha$ denotes moving subject information taking the value of 0 to 1, the moving subject information being a value close to 0 in a motion area and is a value close to 1 in a still area.

In an embodiment of the image processing apparatus according to the present disclosure, when the blending processing unit performs N superimposition processes by using (N+1) moving images as processing targets, the blending processing unit may perform an N-th superimposition process by using an (N−1)th superimposed image $mlt_{n-1}$, and an (N+1)th not-yet-superimposed image $frm_{N+1}$ in accordance with the following equations:

when $N$ is 2 or more, [Math. 2]

$$mlt_N = \frac{\alpha}{2} \times mlt_{N-1} + \left(1 - \frac{\alpha}{2}\right) \times frm_{N+1}, 0 \leq \alpha \leq 1$$

and, when $N$ is 1, $$mlt_1 = \frac{\alpha}{2} \times frm_1 + \left(1 - \frac{\alpha}{2}\right) \times frm_2, 0 \leq \alpha \leq 1$$

where $\alpha$ denotes moving subject information taking a value of 0 to 1, the moving subject information being α value close to 0 in a motion area and close to 1 in a still area.

According to another embodiment of the present disclosure, there is provided an image processing method performed in an image processing apparatus, including: performing a blending process for a plurality of continuously captured images by using a superimposition processing unit, wherein luminance signal information of a RAW image or a full color image as a processing target image is selectively input so as to perform a superimposition process, and sequentially updating data stored in a memory configured to store two image frames so as to enable superimposition of any desired number of images.

According to another embodiment of the present disclosure, there is provided a program for causing an image processing apparatus to perform image processing, including: causing a superimposition processing unit to perform a blending process for a plurality of continuously captured images, wherein luminance signal information of a RAW image or a full color image as a processing target image is selectively input so as to perform a superimposition process, and sequentially updating data stored in a memory configured to store two image frames so as to enable superimposition of any desired number of images.

The program according to an embodiment of the present disclosure is, for example, a program that can be provided using a storage medium and a communication medium that are provided in a computer-readable format to an information processing apparatus and a computer system that can execute various program codes. By providing such a program in a computer-readable format, processing in accordance with the program is realized in the information processing apparatus and the computer system.

Further objects, features, and advantageous effects of the present disclosure will become apparent from the following detailed description of embodiments of the present disclosure and drawings attached thereto. Note that the system in the present specification refers to a logical assembly of a plurality of devices and is not limited to an assembly in which devices having individual structures are contained in a single housing.

According to the configuration of an embodiment of the present disclosure, an apparatus and a method that perform an image superimposition process for the purpose of noise reduction and the like in smaller hardware are realized. Specifically, for example, in a superimposition processing unit that performs a blending process of a plurality of continuously captured images, image superimposition for realizing noise reduction and increasing of resolution is performed. Data that is stored in a memory for storing two image frames is sequentially updated so as to enable superimposition of any desired number of images. An image after the superimposition process is overwritten and stored in a portion of the memory, and the superimposed image that is stored in the memory is used for a superimposition process at the next time and later, thereby enabling superimposition of any desired number of images. Furthermore, by selectively inputting luminance signal information of a RAW image or a full color image as a processing image and performing processing, it is possible to perform a superimposition process for a RAW image and a full color image by using common hardware.

BRIEF DESCRIPTION OF THE DRAWINGS

FIG. 2 illustrates Bayer arrangement;

FIG. 3 is a flowchart illustrating processing performed by a superimposition processing unit a;

FIG. 4 is a flowchart illustrating processing performed by a superimposition processing unit a;

FIG. 15 illustrates an example of the configuration of the hardware of an image processing apparatus according to an embodiment of the present disclosure.

DESCRIPTION OF EMBODIMENTS

Details of an image processing apparatus, an image processing method, and a program according to embodiments of the present disclosure will be described below with reference to the drawings. The description will be given in accordance with the following items.
1. Embodiment in which superimposition process of RAW image and full color image is performed using same circuit
    (1-1) Processing for RAW image at the time of image capture
    (1-2) Processing for full color image at the time of reproduction
2. Example of configuration of hardware used for superimposition process
    (2-1) Example of processing for input image (RAW image) from solid-state image-capturing element
    (2-2) Example of processing for input image (YUV image) from recording and reproduction unit
3. Other embodiments
    (3-1) Embodiment in which resolution increase processing unit is set
    (3-2) Embodiment in which GMV that is calculated at the time of superimposition process of RAW image is used for superimposition process of full color image
4. Example of configuration of hardware of image processing apparatus 1. Embodiment in which Superimposition Process of RAW Image and Full Color Image is Performed Using Same Circuit First, as a first embodiment of an image processing apparatus of the present disclosure, an embodiment in which a superimposition process for a RAW image and a full color image is performed using the same circuit will be described.

The image processing apparatus of the present disclosure is realized in, for example, an image-capturing device, a PC, or the like. In the following, a description will be given of an example of processing in a case where image processing in accordance with an embodiment of the present disclosure is performed in an image-capturing device.

Figure 1:
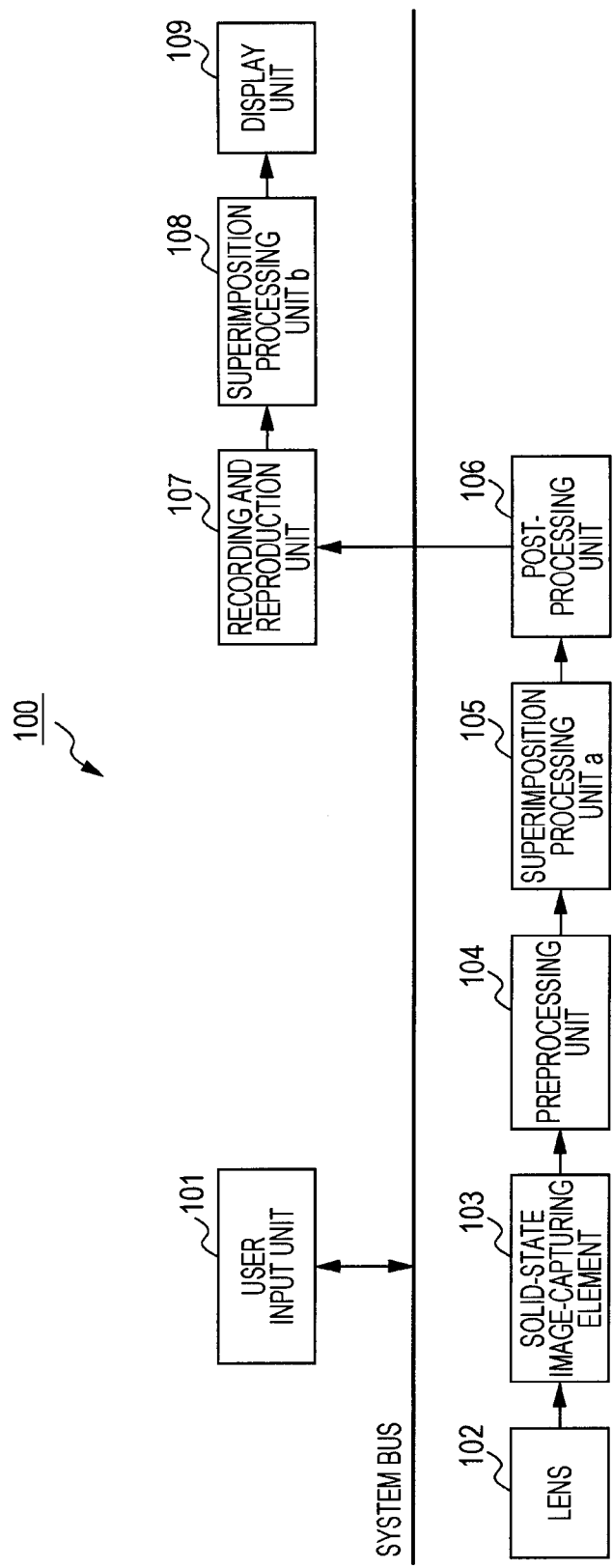
FIG. 1 illustrates an example of the configuration of an image-capturing device, which is an example of an image processing apparatus according to an embodiment of the present disclosure.

FIG. 1 illustrates an example of the configuration of an image-capturing device 100, which is an example of the image processing apparatus of the present disclosure when an image is captured. At the time of image capture, the image-capturing device 100 inputs a RAW image that is captured, that is, a mosaic image, and performs an image superimposition process for realizing noise reduction or increasing of resolution.

A superimposition processing unit a 105 of the image-capturing device 100 shown in FIG. 1 performs a superimposition process for this RAW image.

Furthermore, the image-capturing device 100, which is an example of the image processing apparatus of the present disclosure, performs an image superimposition process for realizing noise reduction or increasing of resolution on a full color image that is generated on the basis of the RAW image.

A superimposition processing unit b 108 of the image-capturing device 100 shown in FIG. 1 performs a superimposition process for this full color image.

Although the superimposition processing unit a 105 and the superimposition processing unit b 108 are illustrated as separate blocks in FIG. 1, these are set as circuitry using common hardware. Specific circuitry will be described later.

In the following, first, the following processes will be described in sequence.
    (1-1) Processing for RAW image at the time of image capture,
    (1-2) Processing for full color image at the time of reproduction
    (1-1) Processing for RAW image at the time of image capture First, a description will be given below, with reference to FIG. 1, of a process of blending (N+1) RAW images at an image-capturing time in an image-capturing device, which is an example of the image processing apparatus of the present disclosure. N is an integer of 1 or more. The superimposition process for RAW images is possible with respect to both a still image and a moving image. In the following embodiment, an example of processing for a still image will be described.

FIG. 1 illustrates the configuration of the image-capturing device 100 as an example of the configuration of the image processing apparatus of an embodiment of the present disclosure. At a timing at which image capture is started in response to the operation of a user input unit 100, such as a shutter, a solid-state image-capturing element 103 converts an optical image that has entered from a lens (optical system) 102 into two-dimensional electrical signals (hereinafter, image data). The solid-state image-capturing element 103 is, for example, a charge coupled device (CCD) or a complementary metal oxide semiconductor (CMOS).

In the case of a single-plate solid-state image-capturing element, the output is, for example, a RAW image of Bayer arrangement shown in FIG. 2. That is, only one of RGB in correspondence with a color filter is generated as a signal of each pixel. This image is called, for example, a mosaic image, and by using this mosaic image, a full color image is generated by an interpolation process that sets all the pixel values of RGB to all the pixels. This pixel value interpolation process is called, for example, a demosaicing process.

As described above, in a case where a noise reduction process or a resolution increasing process is to be performed, by using many more images containing the same subject, effective noise reduction and increasing of resolution are realized. For example, in a case where, for example, (N+1) images are used for image processing for the noise reduction and the increasing of resolution, (N+1) images are continuously captured so as to capture (N+1) RAW images, and a process in which (N+1) RAW images are used or a process in which (N+1) full color images that are generated by using the (N+1) RAW image are used is performed.

In a preprocessing unit 104, a process for correcting defects of an image sensor, such as, for example, vertical stripe and lateral stripe correction, vertical stripe and lateral stripe being contained in the captured image, is performed. The image output from the preprocessing unit 104 is input to the superimposition processing unit a 105, whereby a superimposition process of (N+1) images is performed. In a post-processing unit 106, a color interpolation process (demosaicing process) for converting a RAW image into a full color image, white balance, linear matrix for increasing color reproducibility, a contour emphasizing process for improving ease of viewing, and the like are performed, and after encoding is performed using a compression codec of JPEG or the like, the image is stored in a recording and reproduction unit (SD memory, etc.) 107.

The processing performed by the superimposition processing unit a 105 will be described with reference to the flowchart shown in FIG. 3.

In step S101, a superimposition process of N images is started.

In the following, image data serving as a positioning standard among (N+1) images that are continuously captured by the image-capturing device will be referred to as a key frame. For the key frame, for example, one image frame that is captured immediately after the shutter is pressed is used. N image frames after that become reference frames.

Frames used for a superimposition process among the (N+1) images will be referred to as reference frames.

In step S102, a global motion vector (GMV) calculation process is performed. This GMV calculation process is a process in which the key frame and the reference frame are used as inputs, and a global (entire image) motion vector (Global Motion Vector) between two frames is calculated. For example, a motion vector corresponding to the motion of a camera is obtained.

In the subsequent step S103, a positioning process is performed. This positioning process is a process in which a key frame and one reference frame at which the global motion vector (GMV) has been obtained are read, and by using GMV obtained in the GMV calculation process, the reference frame is positioned to the key frame. The image that is generated by positioning the reference frame at the key frame on the basis of this process, that is, on the basis of the GMV, will be referred to as a motion compensated image.

In step S104, a moving subject detection process is performed. This process is a process in which a difference between the key frame and the reference frame image (motion compensated image) that has been positioned to the key frame is calculated, and a moving subject is detected.

Regarding the key frame and the reference frame that has been positioned to the key frame, if all the subjects are still, it follows that the same portion of the same subject has been captured at the position of the corresponding pixels of two images by the positioning in step S103, and the pixel value difference of the two images becomes almost 0. However, in a case where, for example, the subject contains a moving subjects, such as a car or a person, the pixel portions of these moving subjects, have a motion different from the abovementioned GMV, which is the motion vector of the entire image. Therefore, even if positioning is performed on the basis of the GMV, the same portion of the same subject is not positioned at the positions of the corresponding pixels containing the moving subject contained in the two images, and the pixel value difference of the two images increases.

In step S104, the difference between the corresponding pixels of the key frame and the reference frame that has been positioned to the key frame as described above is obtained, and a moving subject detection process is performed. The detection result is output as motion detection information: α value (0<=α<=1, 0: determined to be moving, 1: determined to be still (no motion)) at each pixel unit.

In step S105, on the basis of the motion detection information: α value at each pixel unit, which has been calculated in step S104, superimposition (blending) of a key frame and a reference frame image (motion compensated image) after positioning based on GMV is performed to generate a superimposed frame (blended image).

The blended image that is a superimposed frame generated in step S105 is used as a key frame for the next superimposition process. In a case where superimposition of N reference images is to be performed on one initial key image, the processing of steps S102 to S105 is repeated N times.

The pixel value of the pixel of interest of the key frame (frame on which a superimposition process has been performed N−1 times) at the time of an N-th superimposition process and the reference frame ((N+1)th frame)) are represented as key frame: $mlt_{N-1}$, reference frame: $frm_{N+1}$. The greater the value of the index of (N−1), (N+1), etc., the later with respect to time the image has been captured.

Furthermore, the moving subject detection result of the pixel of interest is denoted as α.

Blending equations at the time of an N-th superimposition process using the above data are shown below.

When $N$ is 2 or more, [Math. 3]

$$mlt_N = \frac{\alpha}{N+1} \times frm_{N+1} + \left(1 - \frac{\alpha}{N+1}\right) \times mlt_{N-1}, 0 \leq \alpha \leq 1$$

and, when $N$ is 1, $$mlt_1 = \frac{\alpha}{2} \times frm_2 + \left(1 - \frac{\alpha}{2}\right) \times frm_1, 0 \leq \alpha \leq 1$$

The pixel values of the corresponding pixels of the key image and the positioned reference image (motion compensated image) are blended in accordance with the above equations so as to generate a superimposed frame (blended image).

Regarding the blending process, as described above, in a case where N superimposition processes are to be performed by using (N+1) still images as processing targets, an N-th superimposition process is performed in accordance with the above equations by using an (N−1)th superimposed image $mlt_{N-1}$, and an (N+1)th not-yet-superimposed image $frm_{N+1}$.

The blending ratio of the positioned reference image (motion compensated image) in a case where the motion detection information: α value at each pixel unit is large, that is, at a pixel position that is estimated to belong to a still subject is set large. However, in a case where the motion detection information: α value at each pixel unit is small, that is, at a pixel position that is estimated to belong to a moving subject, the blending ratio of the positioned reference image (motion compensated image) is set small. In the manner described above, a blending process in accordance with the motion information of a pixel unit is performed.

(1-2) Processing for Full Color Image at Reproduction Time

Next, a description will be given of an example of processing for a full color image. This process is performed in a case where, for example, an image is to be displayed on a display unit 109 of the image-capturing device 100 shown in FIG. 1. The superimposition process for a full color image is possible with respect to both a still image and a moving image. In the following embodiment, an example of processing for a moving image will be described.

In the post-processing unit 106 of the image-capturing device 100 shown in FIG. 1, a color interpolation process (demosaicing process) for converting a RAW image into a full color image, white balance, linear matrix that increases color reproducibility, a contour emphasizing process that improves ease of viewing, and the like are performed. After the image is encoded (moving image codec (H.264, MPEG-2, etc.) using a compression codec of JPEG or the like, the image is stored in the recording and reproduction unit (SD memory, etc.) 107.

On the display unit 109, for example, a list of thumbnail images corresponding to full color images stored in the recording and reproduction unit (SD memory, etc.) 107 is displayed. When instructions of selecting and inputting a certain thumbnail image are input from a user, the decoding of the image corresponding to the selected thumbnail is performed in the recording and reproduction unit 107. The decoded image becomes, for example, image data having a full color image format of RGB, or having a YUV image format of luminance and color difference. The decoded image is input to the superimposition processing unit b 108.

In the superimposition processing unit b 108, a decoded image of a full color image or the like is input, and an image superimposition process for the purpose of noise reduction and increasing of resolution is performed. The result of this superimposition process is sent to the display unit 109.

A description will be given, with reference to the flowchart shown in FIG. 4, of the procedure of processing performed by the superimposition processing unit b 108. The processing example described below will be described as an example of a moving image reproduction process, and the moving image reproduction is performed by continuously displaying still images that were captured at a fixed time interval. In the case of superimposition at the reproduction time of a moving image, for example, as a key frame, the most recent frame that is input from the recording and reproduction unit 107 is set as a key frame, and the frame previous to the key frame is set as a reference frame.

When an input image from the recording and reproduction unit 107 is input at a full color format (RGB), in step S201, a RGB to YUV conversion process is performed, and a conversion into luminance and color difference signals is made. On the other hand, when the input image is input at a YUV format, a RGB to YUV conversion process of step S201 is omitted.

In step S202, a global motion vector (GMV) calculation process is performed. This GMV calculation process is a process in which a key frame and a reference frame are used as inputs, and a global (entire image) motion vector (Global Motion Vector) between two frames is calculated. For example, a motion vector that corresponds to the motion of a camera is obtained.

In the subsequent step S203, a positioning process is performed. This positioning process is a process in which a key frame and one reference frame for which a global motion vector (GMV) is obtained are read, and by using the GMV obtained in the GMV calculation process, the reference frame is positioned to the reference frame. The image that is generated by positioning the reference frame at the key frame on the basis of this process, that is, GMV, is referred to as a motion compensated image.

In step S204, a moving subject detection process is performed. This process is a process in which the difference between the key frame and the reference frame image (motion compensated image) that is positioned to the key frame is calculated, and a moving subject is detected. The detection result is output as the motion detection information: α value (0<=α<=1, 0: determined to be moving, 1: determined to be still (no motion)) at each pixel unit.

In step S205, on the basis of the motion detection information: α value at each pixel unit, which has been calculated in step S204, the key frame and the reference frame image (motion compensated image) after positioning based on GMV are blended, and a superimposed frame (blended image) is generated.

The α blending process in step S205 is such that the key frame ((N+1)th frame $frm_{N+1}$) and the reference image (N−1) th superimposed frame $mlt_{N-1}$) are blended in accordance with the α value obtained from the moving subject detection unit. For performing a blending process (superimposition process), a superimposition process is performed on only the luminance (Y) signal of a YUV format. The equations of the N-th superimposition process are shown below.

When $N$ is 2 or more, [Math. 4]

$$mlt_N = \frac{\alpha}{2} \times mlt_{N-1} + \left(1 - \frac{\alpha}{2}\right) \times frm_{N+1}, 0 \leq \alpha \leq 1$$

and, when $N$ is 1, $$mlt_1 = \frac{\alpha}{2} \times frm_1 + \left(1 - \frac{\alpha}{2}\right) \times frm_2, 0 \leq \alpha \leq 1$$

In accordance with the above-described equations, the pixel values of the corresponding pixels of the key image and the positioned reference image (motion compensated image) are blended to generate a superimposed frame (blended image).

Regarding the blending process, as described above, in a case where N superimposition processes are to be performed by using (N+1) moving images as processing targets, the N-th superimposition process is performed in accordance with the above equations by using the (N−1)th superimposed image $mlt_{N-1}$, and the (N+1)th not-yet-superimposed image $frm_{N+1}$.

The blending ratio of the positioned reference image (motion compensated image) is set large in a case where the motion detection information: α value at each pixel unit is large, that is, at a pixel position that is estimated to belong to a still subject. However, the blending ratio of the positioned reference image (motion compensated image) is set small in a case where the motion detection information: α value at each pixel unit is small, that is, at a pixel position that is estimated to belong to a moving subject. In the manner described above, a blending process corresponding to the motion information of a pixel unit is performed.

The superimposed frame calculated in accordance with the above equations becomes a reference frame for the next superimposition process. By using the most recent frame that is the next frame as a key frame, a new superimposition process is performed.

Finally, in step S206, a YUV to RGB conversion process is performed on a luminance signal (Y) on which a superimposition process has been performed and a color difference signal (UV) output from the RGB to YUV conversion unit so as to make a conversion into a full color format, and a full color image is displayed on the display unit 109.

The above-mentioned processing examples are the following:

(1-1) Processing for RAW image at the time of image capture (1-2) Processing for full color image at the time of reproduction For a process for a full color image at the time of reproduction, for example, RGB to YUV conversion is performed, and a superimposition process is performed on only the luminance (Y) signal of a YUV format.

As a result of performing such processing, the signal of each pixel unit, on which a superimposition process is performed, (1-1) becomes a signal (for example, any one of RGB signals) that is set to pixels forming the RAW image in the case of a process for a RAW image at the time of image capture, and (1-2) becomes only the luminance (Y) signal of a YUV format regarding each of the pixels forming a full color image in the case of a process for a full color image at the time of reproduction.

That is, it is possible to perform a process by using one signal value with regard to each of the pixels forming an image in the case of both a superimposition process for a RAW image and a superimposition process for a full color image.

As a result, it is possible for the superimposition processing unit a 105 that performs a superimposition process for a RAW image and the superimposition processing unit b 108 that performs a superimposition process for a full color image to use the same execution circuit for the superimposition process by differentiating between a case in which the input signal is made to be each pixel value of a RAW image and a case in which the input signal is made to be a luminance value (Y) of each pixel of a full color image.

With this configuration, a process using one superimposition processing circuit with regard to two different pieces of image data of a RAW image and a full color image is realized.

The processing target image may be either a moving image or a still image. In the above-described example, processing examples for a RAW image of a still image and a full color image of a moving image have been described. Alternatively, a superimposition process using one common circuit becomes possible for a RAW image of a moving image and a full color image of a still image. Specific circuitry will be described in the following items.

2. Example of Configuration of Hardware Using Superimposition Process

Next, a description will be given of an example of the configuration of hardware using a superimposition process.

The following two examples of processing will be described below in sequence.

(2-1) Example of processing for input image (RAW image) from solid-state image-capturing element (2-2) Example of processing for input image (full color image (YUV image)) from recording and reproduction unit In the following description of hardware, a description will be given of a process for a RAW image and a process for a full color image are realized using one common circuitry, and also of a process for reducing memory capacity that becomes necessary in a superimposition process, which is another feature of the present disclosure.

(2-1) Example of Processing for Input Image (RAW Image) from Solid-State Image-Capturing Element First, a description will be given below, with reference to FIGS. 5 to 9, of a processing example of an image superimposition (blending) process for an input image (RAW image) from a solid-state image-capturing element.

Figure 5:
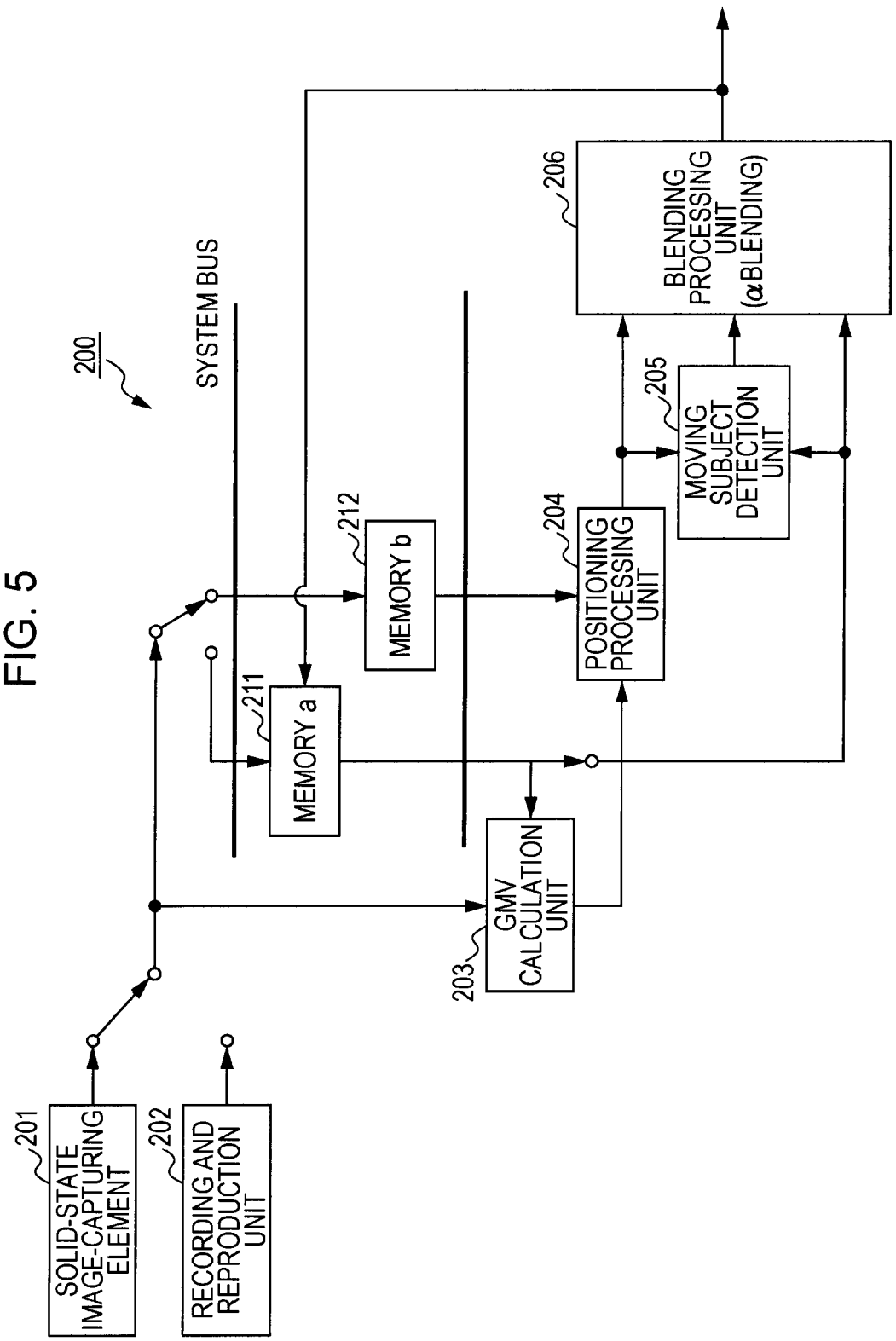
FIG. 5 illustrates the configuration and process of a superimposition processing unit that performs an image superimposition (blending) process for an input image (RAW image) from a solid-state image-capturing element.

FIG. 5 illustrates common specific circuitry that is used as the superimposition processing unit a 105 and the superimposition processing unit b 108 shown in FIG. 1.

Figure 3:
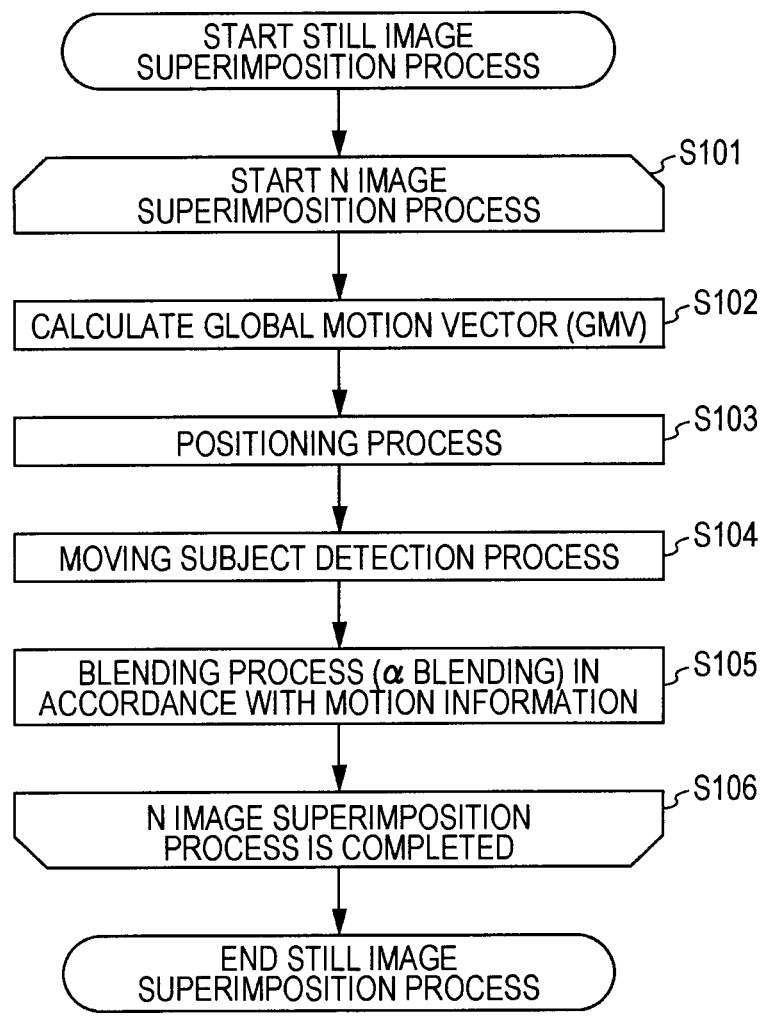
Figure 4:
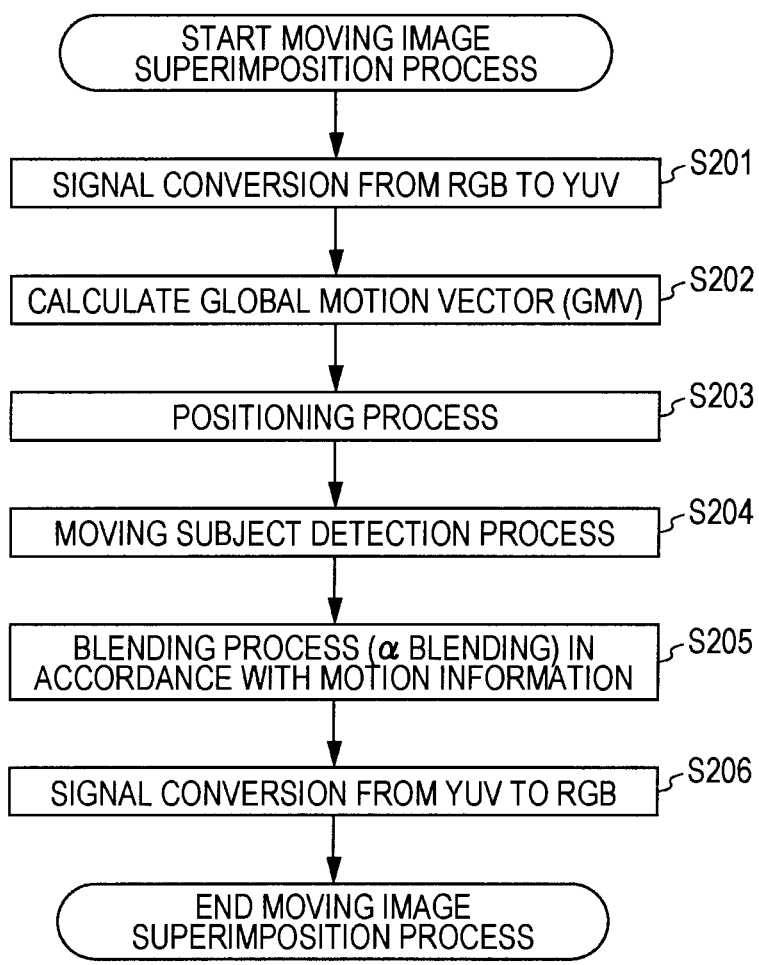

A global motion vector (GMV) calculation unit 203 shown in FIG. 5 performs a process of step S102 of the flow shown in FIG. 3 and a process of step S202 of the flow shown in FIG. 4.

A positioning processing unit 204 shown in FIG. 5 performs a process of step S103 of the flow shown in FIG. 3 and a process of step S203 of the flow shown in FIG. 4.

A moving subject detection unit 205 shown in FIG. 5 performs a process of step S104 of the flow shown in FIG. 3 and a process of step S204 of the flow shown in FIG. 4.

A blending processing unit 206 shown in FIG. 5 performs a process of step S105 of the flow shown in FIG. 3 and a process of step S205 of the flow shown in FIG. 4.

In a case where the superimposition processing unit 200 shown in FIG. 5 functions as the superimposition processing unit a 105 shown in FIG. 1, the superimposition processing unit 200 inputs a RAW image from the solid-state image-capturing element 201 (=the solid-state image-capturing element 103 of FIG. 1) and performs a superimposition process for a RAW image.

On the other hand, in a case where the superimposition processing unit 200 functions as the superimposition processing unit b 108 shown in FIG. 1, the superimposition processing unit 200 inputs the luminance signal (Y) of a YUV image from the recording and reproduction unit 202 (=the recording and reproduction unit 107 of FIG. 1) and performs a superimposition process for a full color image.

A frame memory a 211 and a memory b 212 in FIG. 5 are memories for storing a RAW image output by the solid-state image-capturing element 201 (=the solid-state image-capturing element 103 of FIG. 1) and a full color image output by the recording and reproduction unit 202 (=the recording and reproduction unit 107 of FIG. 1), respectively.

In the following, first, a description will be given of an example of processing in a case where the superimposition processing unit a 105 shown in FIG. 1 performs processing described with reference to the flowchart shown in FIG. 3.

Figure 6:
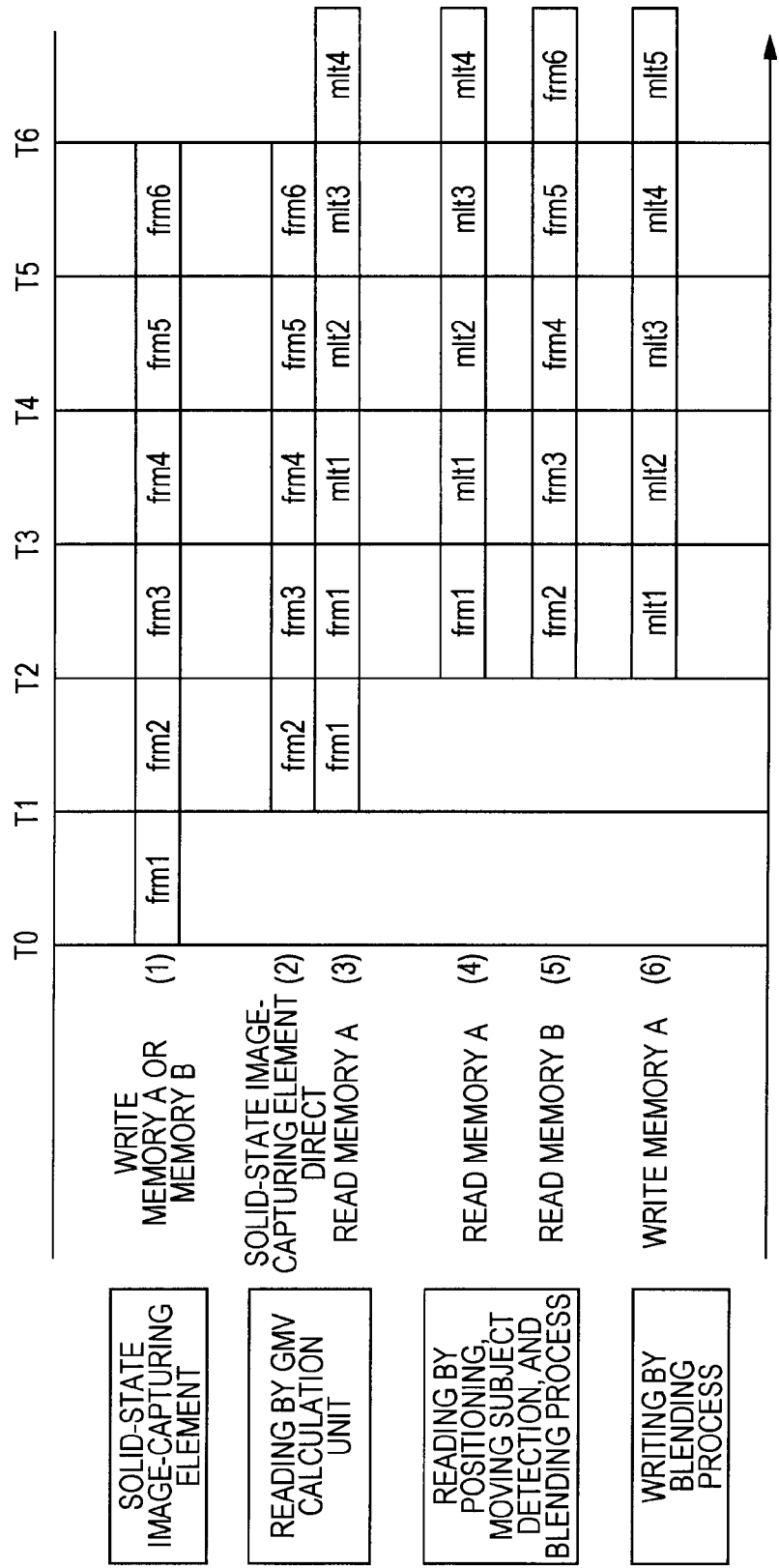
FIG. 6 illustrates a timing chart of processing in a case where the superimposition processing unit shown in FIG. 5 performs a superimposition process of a RAW image.

A timing chart of processing in a case where the superimposition processing unit shown in FIG. 5 performs a superimposition process for a RAW image is shown in FIG. 6.

FIG. 6 illustrates passage of time, times T0, T1, T2 . . . from left to right.

Also, FIG. 6 illustrates processes of the following (1) to (6) from the above.

(1) Process for writing (Write)RAW image from solid-state state image-capturing element 201 to memory a 211 and memory b 212, (2) Process for inputting image from solid-state image-capturing element 201 to global motion vector (GMV) calculation unit 203, (3) Process for reading (Read) image from memory a 211 by global motion vector (GMV) calculation unit 203, (4) Process for reading (Read) image from memory a 211 by blending processing unit 206, (5) Process for reading (Read) image from memory b 212 by positioning processing unit 204, moving subject detection unit 205, and blending processing unit 206, and (6) Process for writing (Write) image to memory a 211 by blending processing unit 206.

An image signal that is written to the memory a 211 and the memory b 212 is a RAW image or a superimposed image that is generated on the basis of a RAW image, and has any one of the pixel values of RGB with respect to one pixel. That is, only one signal value is stored with regard to one pixel.

frm1, frm2, and frm3 . . . shown in FIG. 6 denote image frames (RAW image) before a superimposition process, which are used in the superimposition process, and mlt1, mlt2, mlt3 . . . denote image frames on which a superimposition process has been performed.

A first superimposed frame that is generated using the image frame (frm1) and the image frame (frm2) is an image frame (mlt1).

This corresponds to a process in which the first superimposed image frame (mlt1) shown in (6) is generated using the image frame (frm1) and the image frame (frm2), which are shown in (4) and (5) of T1 to T2 of the timing chart shown in FIG. 6.

At the next timing T2 to T3, a second superimposed image frame (mlt2) shown in (6) is generated using the first superimposed image frame (mlt1) and the image frame (frm3) shown in (4) and (5) of T2 to T3 of the timing chart shown in FIG. 6.

In the manner described above, as time passes, by using the superimposed image frame (mltn) that is generated immediately before and the most recent input image (frmn+2), a new superimposed image frame (mltn+1) is sequentially generated and is updated. In a case where, for example, N superimpositions are to be performed using (N+1) images, a superimposed image frame (mltN) that is generated after N superimposition processes is generated, and processing of one unit is completed.

The processing sequence of the superimposition process for a RAW image, which is performed in the superimposition processing unit 200 (=the superimposition processing unit a 105=the superimposition processing unit b 108 of FIG. 1) shown in FIG. 5, will be described below with reference to the timing chart of FIG. 6 and the state diagram at each timing of FIGS. 7 to 9.

At timing T0 to T1 (see FIG. 6) at which the image capture has started as a result of, for example, a shutter being pressed, image data (frm1) output from the solid-state image-capturing element 201 is written into a frame memory a 211.

Figure 7:
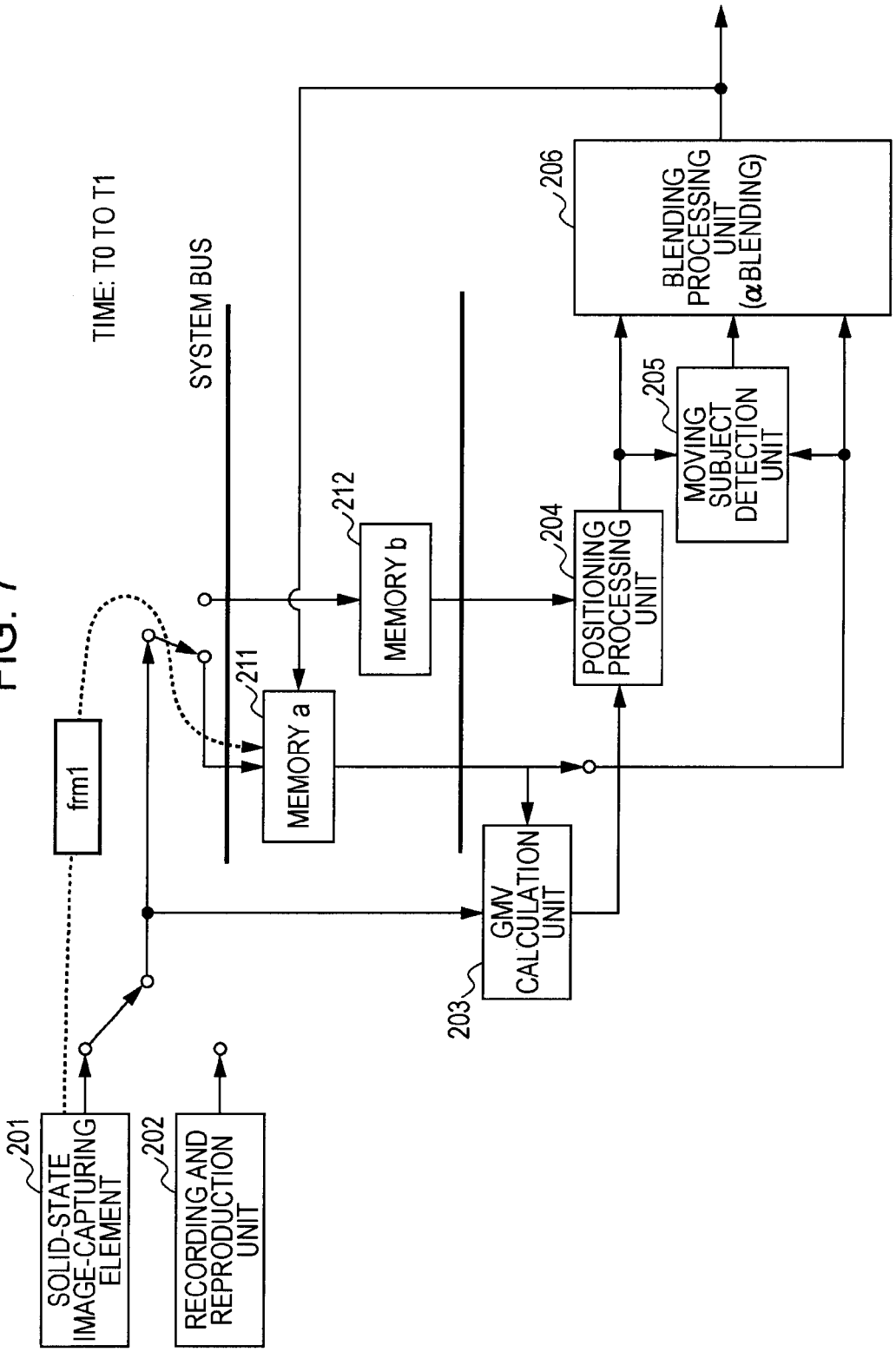
FIG. 7 illustrates a state transition in a case where the superimposition processing unit shown in FIG. 5 performs a superimposition process for a RAW image.

FIG. 7 illustrates the state at timing T0 to T1.

Next, at timing T1, the second image data (frm2) is transmitted by the solid-state image-capturing element 201. At this time, the image data is written into the frame memory b 212 and is, at the same time, input to the GMV calculation unit 203. At the same time, the first image data (frm1) is input from the frame memory a 211 to the GMV calculation unit 203, and a global motion vector (GMV) between two frames of the first image data (frm1) and the second image data (frm2) is obtained in the GMV calculation unit 203.

Figure 8:
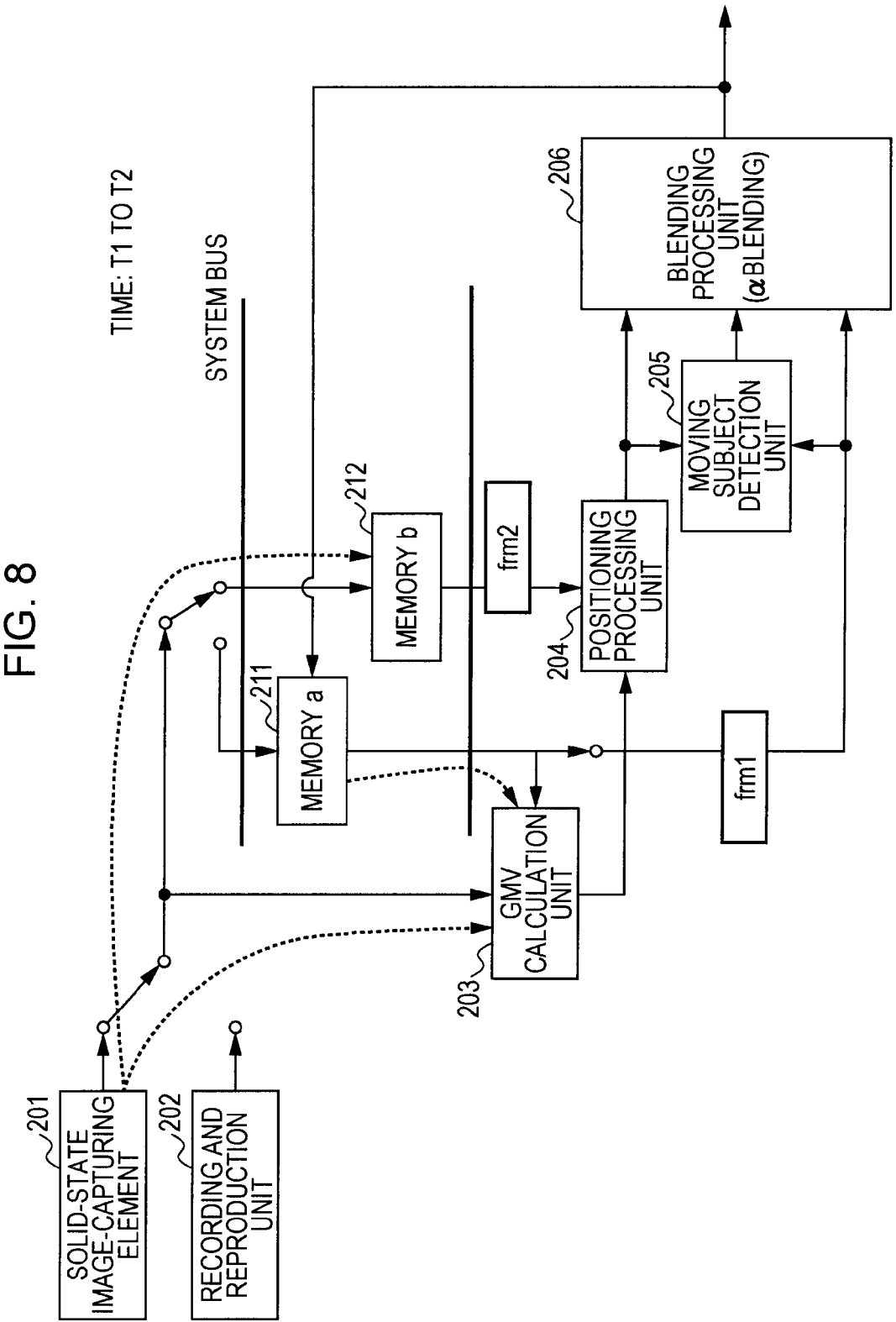
FIG. 8 illustrates a state transition in a case where the superimposition processing unit shown in FIG. 5 performs a superimposition process for a RAW image.

FIG. 8 illustrates the state at timing T1 to T2.

At timing T2, the second image data (frm2) is input from the frame memory b 212 to the positioning unit 204.

In addition, the GMV calculated by the GMV calculation unit 203, that is, the GMV between the first image data (frm1) and the second image data (frm2), which is obtained at timing T1 to T2, is input, and a process for positioning the second image data (frm2) at the subject position of the first image data (frm1) is performed on the basis of the input GMV. That is, a motion compensated image is generated.

The present processing example is an example of a superimposition process for a still image. In the case of a still image, a preceding image is used as a key image, and a succeeding image is used as a reference image, and positioning of positioning the succeeding reference image at the position of the preceding key image is performed.

The second positioned image data (frm2) is input, together with the first image data (frm1), to the moving subject detection unit 205 and the blending processing unit 206.

The moving subject detection unit 205 performs the comparison of pixel values at the corresponding position of the first image data (frm1) and the positioned image data (frm2), generates motion detection information: $\alpha$ value ($0<=\alpha<=1$, 0: determined to be moving, 1: determined to be still (no motion)) at a pixel unit, which corresponds to the difference, and outputs it to the blending processing unit 206.

The blending processing unit 206 performs a blending process of the first image data (frm1) and the second positioned image data (frm2) by using the motion detection information: $\alpha$ value ($0<=\alpha<=1$) at a pixel unit, which has been obtained in the moving subject detection unit 205, generating a superimposed frame.

The superimposed frame (mlt1) that is a first blended image generated by the blending process of the first image data (frm1) and the second positioned image data (frm2) is output from the blending processing unit 206 and is overwritten in the frame memory a 211.

Figure 9:
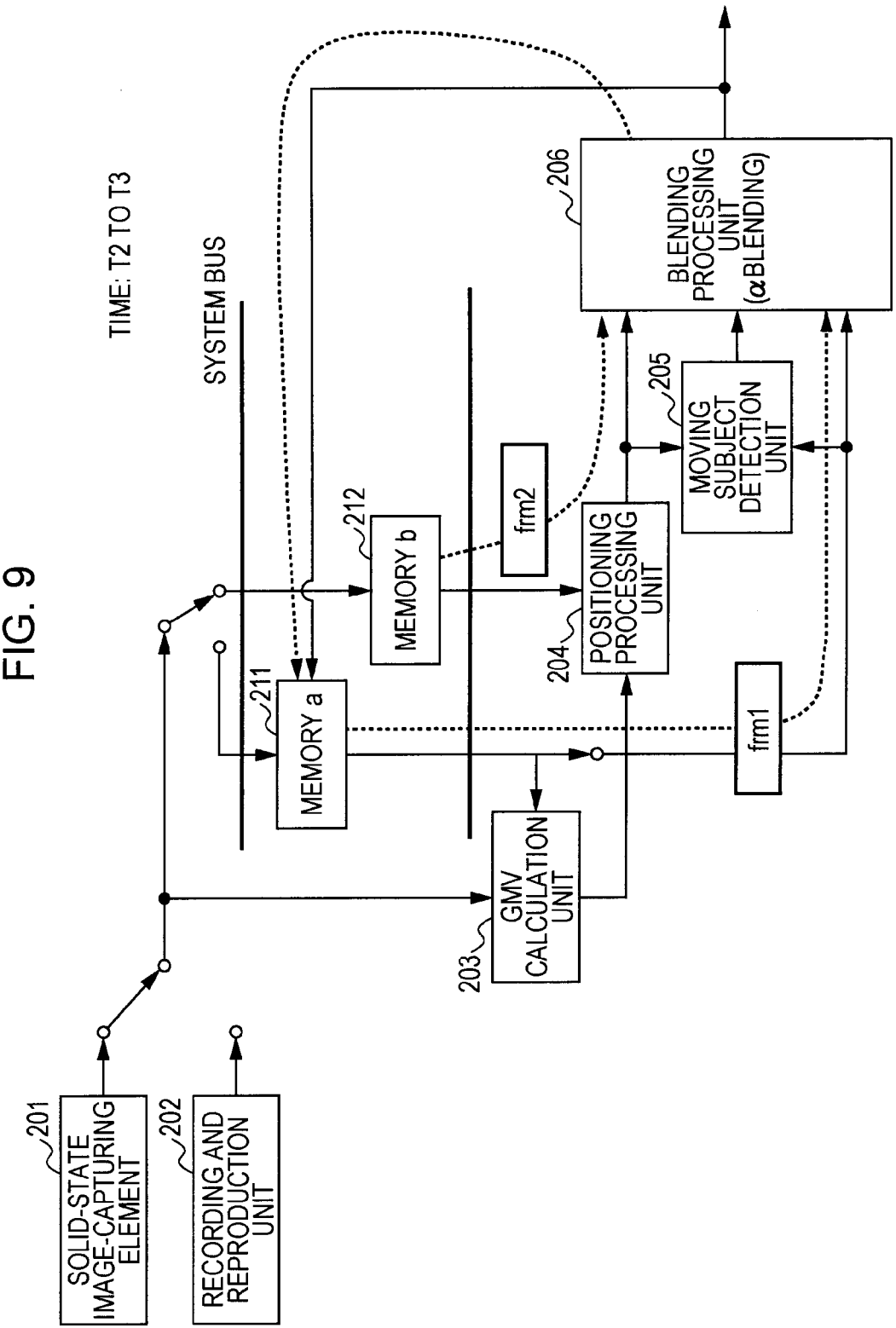
FIG. 9 illustrates a state transition in a case where the superimposition processing unit shown in FIG. 5 performs a superimposition process for a RAW image.

FIG. 9 illustrates the state at timing T2 to T3.

As is understood from the processing described with reference to FIGS. 5 to 9, in the superimposition process using the superimposition processing unit 200 shown in FIG. 5, two memories for storing two images, that is, the memory a 211 and the memory b 212, are used only, and a superimposition process for any desired number of images, for example, N images, is realized.

As described above, in the present embodiment, the maximum number of images that are stored in the frame memory is two for frame memories a and b independent of the number of superimposed images. In the present disclosure, advantages identical to those in the case in which all the (N+1) images are stored in the frame memory are obtained while saving frame memory capacity.

(2-2) Processing Example for Input Image (Full Color Image (YUV Image)) from Recording and Reproduction Unit Next, a description will be given, with reference to FIGS. 10 to 12, of a processing example for an input image (full color image (YUV image)) from a recording and reproduction unit.

Figure 10:
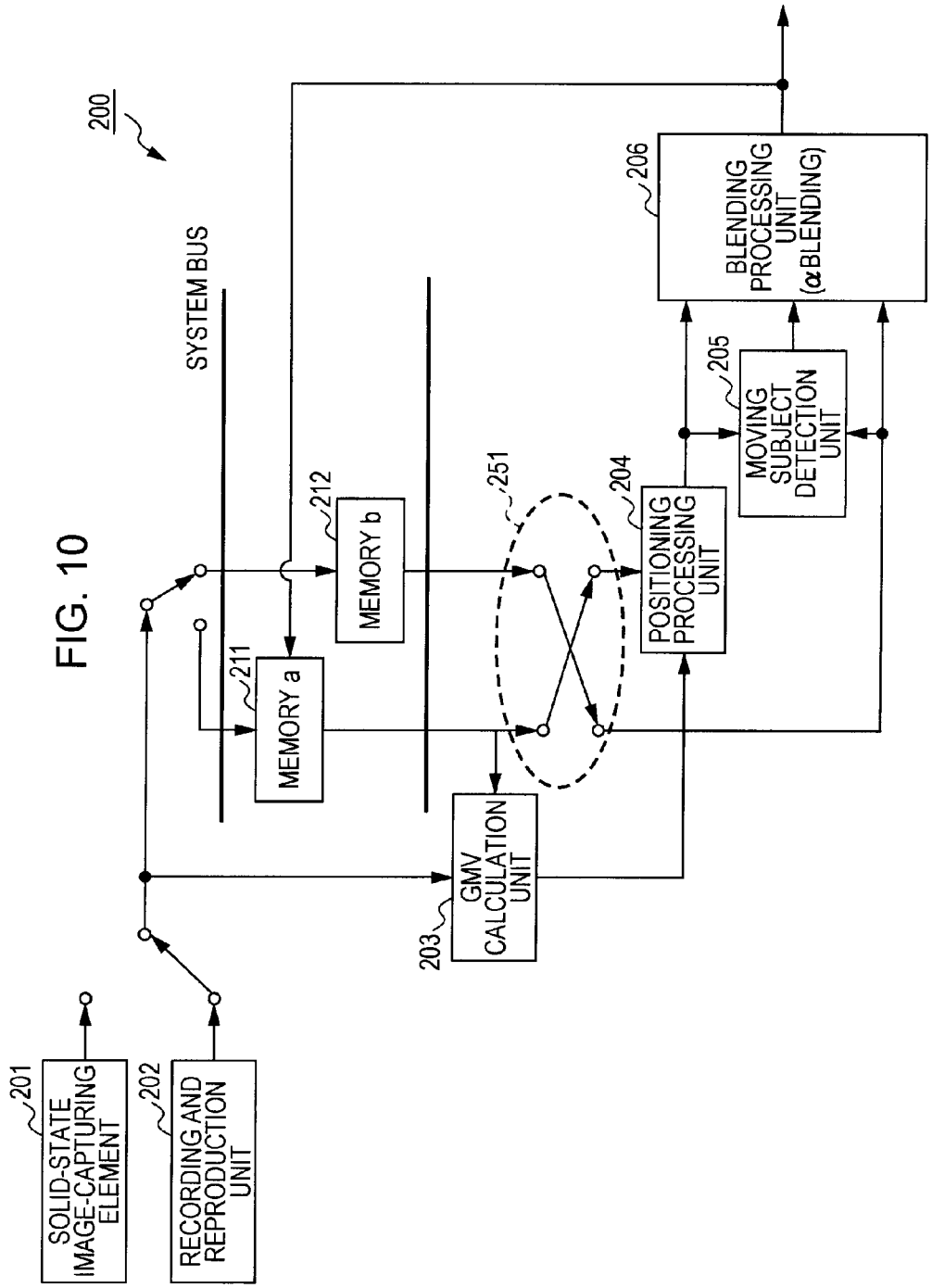
FIG. 10 illustrates the configuration and process of a superimposition processing unit that performs an image superimposition (blending) process for an image output from a recording and reproduction unit.

FIG. 10 illustrates a circuit that is substantially the same as the circuit described earlier with reference to FIG. 5, and illustrates common circuitry used as the superimposition processing unit a 105 and the superimposition processing unit b 108 shown in FIG. 1. However, in a case where the circuit is used as the superimposition processing unit b 108, the connection configuration of a line connection unit 251 is changed, and furthermore, the input is changed to the input configuration from the recording and reproduction unit 202. These are realized by switching between switches that are set to the line connection unit 251 and the connection unit of the recording and reproduction unit 202.

In the following, a description will be given of a process that is performed in the superimposition processing unit b 108 shown in FIG. 1, that is, a processing example in a case where the process described with reference to the flowchart shown in FIG. 4 is performed.

Figure 11:
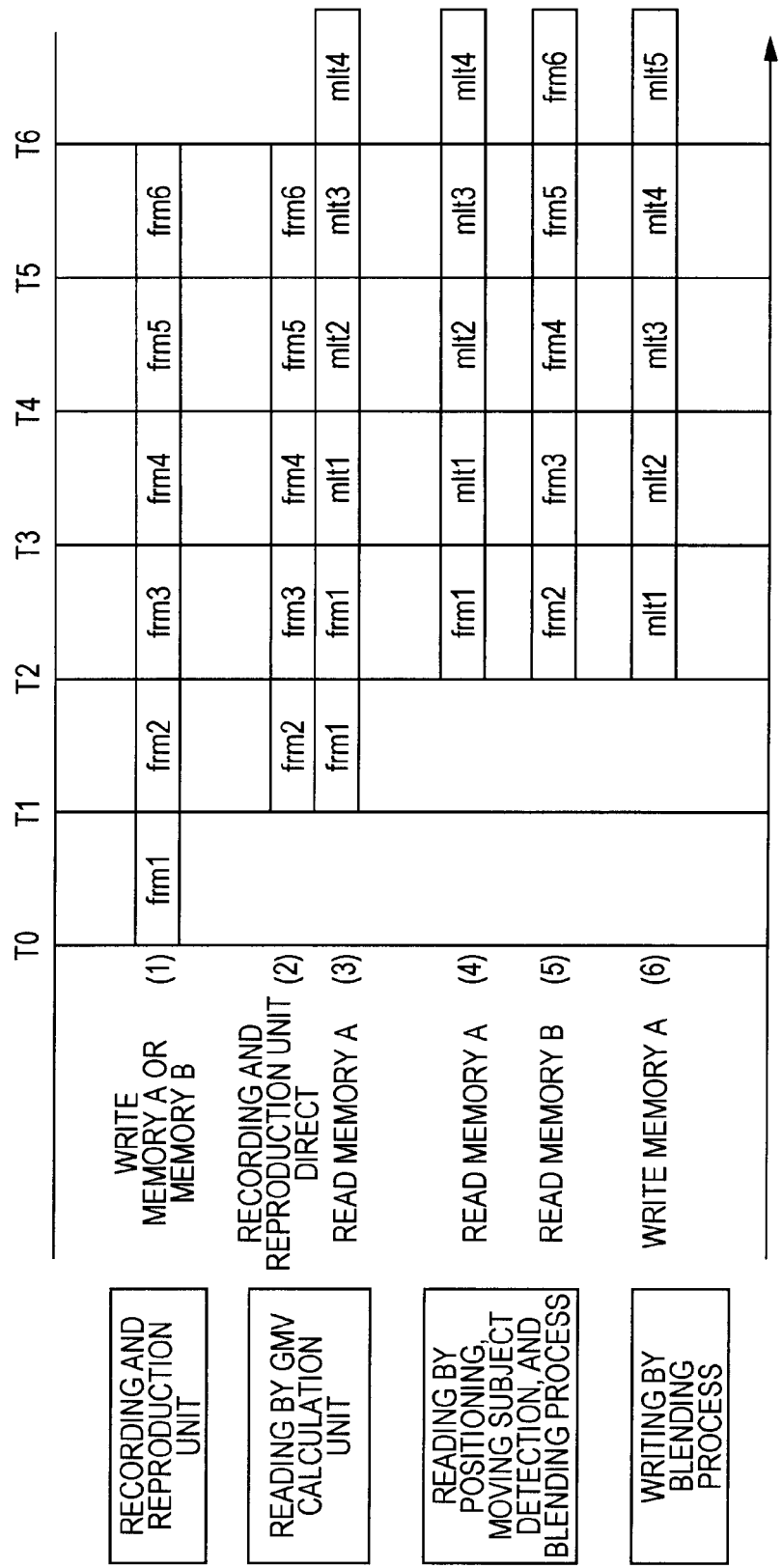
FIG. 11 illustrates a timing chart of processing in a case where the superimposition processing unit shown in FIG. 10 performs a superimposition process for a full color image.

The timing chart of processing in a case where the superimposition processing unit of FIG. 10 performs a superimposition process by applying a luminance signal (Y) of a YUV image that is generated on the basis of a full color image is shown in FIG. 11.

FIG. 11 is a timing chart similar to FIG. 6, and illustrates passage of time, time T0, T1, T2 . . . from left to right.

Also, FIG. 11 illustrates processes of the following (1) to (6) from the above.

(1) Process for writing (Write) luminance signal (Y) in YUV image to memory a 211 and memory b 212 from recording and reproduction unit 202, (2) Process for inputting luminance signal (Y) in YUV image from recording and reproduction unit 202 to global motion vector (GMV) calculation unit 203, (3) Process for reading (Read) image signal (luminance signal (Y)) from memory a 211 by global motion vector (GMV) calculation unit 203, (4) Process for reading (Read) image signal (luminance signal (Y)) from memory a 211 by positioning processing unit 204, moving subject detection unit 205, and blending processing unit 206, (5) Process for reading (Read) image signal (luminance signal (Y)) from memory b 212 by positioning processing unit 204, moving subject detection unit 205, and blending processing unit 206, and (6) Process for writing (Write) image signal (luminance signal (Y)) to memory a 211 by blending processing unit 206.

The image signal that is written to the memory a 211 and the memory b 212 is a luminance signal (Y) image in the YUV image, or a superimposed image that is generated on the basis of a luminance signal (Y) image in a YUV image, and is one pixel value of the luminance signal (Y) with respect to one pixel. That is, only one signal value is stored with respect to one pixel.

frm1, frm2, frm3 . . . , which are shown in FIG. 11, denote image frames before a superimposition process, which are used in the superimposition process, and mlt1, mlt2, mlt3, . . . denote image frames on which a superimposition process has been performed.

The first superimposed frame that is generated using the image frame (frm1) and the image frame (frm2) is an image frame (mlt1).

This corresponds to a process in which the first superimposed image frame (mlt1) shown in (6) is generated using the image frame (frm1) and the image frame (frm2), which are shown in (4) and (5) of T1 to T2 of the timing chart shown in FIG. 11.

At the next timing T2 to T3, the second superimposed image frame (mlt2) shown in (6) is generated using the first superimposed image frame (mlt1) and the image frame (frm3), which are shown in (4) and (5) of T2 to T3 of the timing chart shown in FIG. 11.

In the manner described above, as time passes, a new superimposed image frame (mltn+1) is sequentially generated by using a superimposed image frame (mltn) that was generated immediately before and the most recent input image (frmn+2), and is updated. In a case where, for example, N superimpositions are to be performed using (N+1) images, a superimposed image frame (mltN) that is generated after the N superimposition processes is generated, and processing of one unit is completed.

A description will be given below, with reference to the timing chart of FIG. 11, of a processing sequence of a superimposition process for a YUV image, which is performed in the superimposition processing unit 200 (=the superimposition processing unit b 108=the superimposition processing unit b 105 of FIG. 1) shown in FIG. 10.

A description will be mainly given below, with reference to FIGS. 5 to 9, of portions different from the process for a RAW image, which is described earlier.

In this process, as shown in FIGS. 10 and 11, an input to the superimposition processing unit 200 is performed from the recording and reproduction unit 202 rather than from the solid-state image-capturing element 201.

For example, an image to be reproduced, which is selected by a user, is selected and obtained from a memory in the recording and reproduction unit 107, and is output to the superimposition processing unit 200. In the recording and reproduction unit 107, a format conversion from a RGB format into a YUV format is performed as necessary, the generated luminance signal (Y) is supplied to the memory a 211 and the memory b 212, and processing is started.

At timing T0 to T1 (see FIG. 11), the image data (frm1) output from the recording and reproduction unit 202 shown in FIG. 10 is written to the frame memory a 211. In this example, a luminance signal (Y) is written to the frame memory a 211 and the frame memory b 212.

The state at this timing T0 to T1 differs in that data is output from the recording and reproduction unit 202 in FIG. 7 described earlier.

Next, at timing T1, the second image data (frm2) is output from the recording and reproduction unit 202. At this time, the second image data (frm2) is written to the frame memory b 212 and is, at the same time, input to the GMV calculation unit 203. At the same time, the first image data (frm1) is input to the GMV calculation unit 203 from the frame memory a 211, and in the GMV calculation unit 203, a global motion vector (GMV) between two frames of the first image data (frm1) and the second image data (frm2) is obtained.

The state of this timing T1 to T2 differs in that data is output from the recording and reproduction unit 202 in FIG. 8 described earlier.

At timing T2, the first image data (frm1) is input from the frame memory a 211 to the positioning unit 204, GMV between the first image data (frm1) and the second image data (frm2), which are obtained at T1 to T2, is input, and a positioning process for positioning the first image data (frm1) at the subject position of the second image data (frm2) on the basis of the input GMV is performed. That is, a motion compensated image is generated.

The present processing example is an example of a superimposition process for a moving image. In the case of a moving image, a succeeding image is used as a key image, a preceding image is used as a reference image, and positioning of positioning the preceding reference image at the position of the succeeding key image is performed.

The first positioned image data (frm1), together with the second image data (frm2), is input to the moving subject detection unit 205 and the blending processing unit 206.

The moving subject detection unit 205 performs a comparison of pixel values at corresponding positions of the first positioned image data (frm1) and the second image data (frm2), generates motion detection information: $\alpha$ value ($0 <= \alpha <= 1$, 0: determined moving, 1: still (no motion) determination) at a pixel unit, which corresponds to the difference, and outputs the motion detection information to the blending processing unit 206.

The blending processing unit 206 performs a blending process for the first positioned image data (frm1) and the second image data (frm2) by using the motion detection information: α value (0<=α<=1) at a pixel unit, which is obtained in the moving subject detection unit 205, and generates a superimposed frame.

The superimposed frame (mlt1) that is the first blended image generated by the blending process for the first positioned image data (frm1) and the second image data (frm2) is output from the blending processing unit 206, is overwritten to the frame memory a 211, and is output to the display unit 109.

Figure 12:
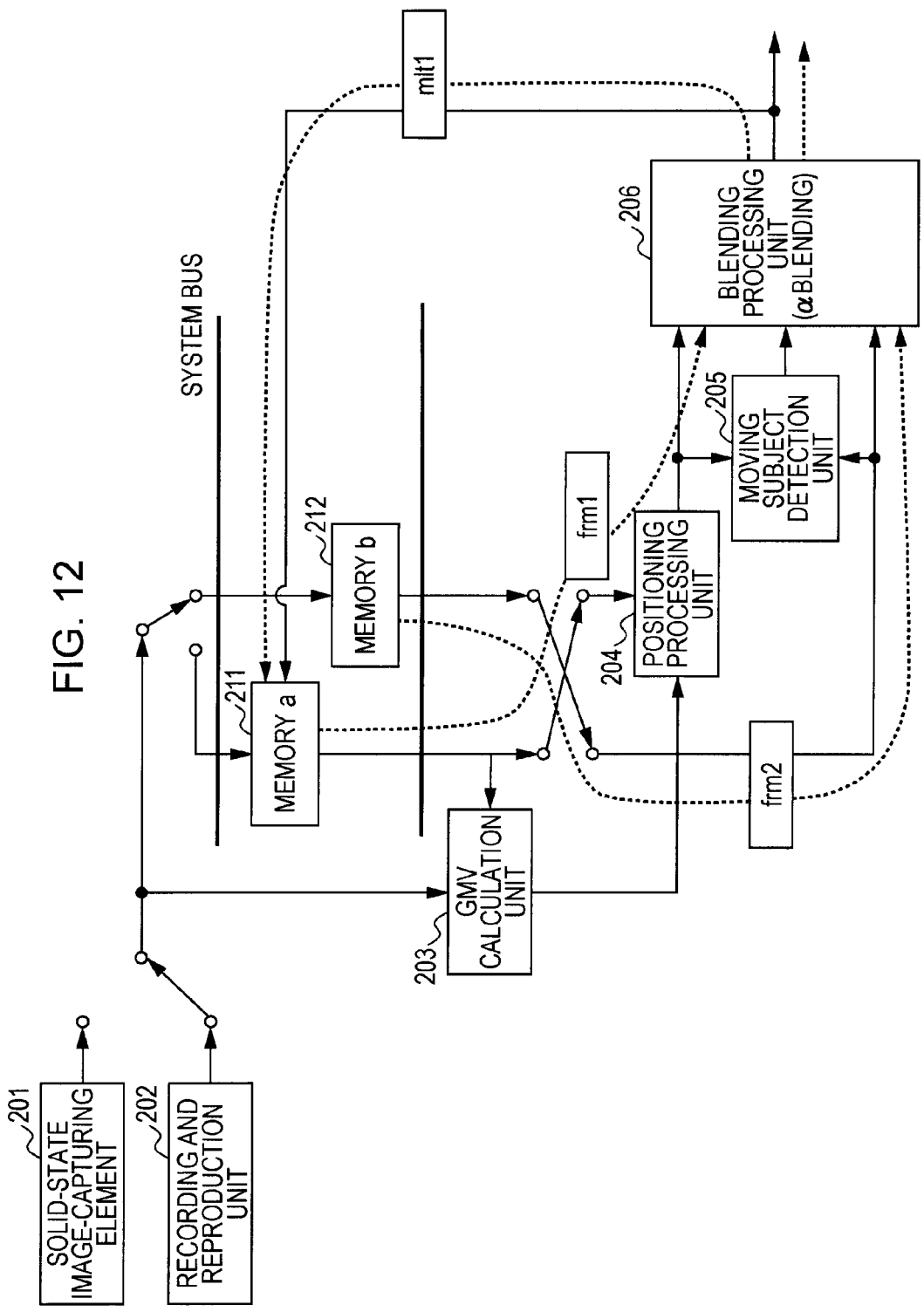
FIG. 12 illustrates a state transition in a case where the superimposition processing unit shown in FIG. 10 performs a superimposition process for a full color image.

FIG. 12 illustrates the state at this timing T2 to T3.

As is understood from the superimposition process for a RAW image, which is described with reference to FIGS. 5 to 9, and from the superimposition process for a full color image, which is described with reference to FIGS. 10 to 12, a superimposition process for a RAW image and a superimposition process for a full color image are performed by using the common superimposition processing unit 200 shown in FIGS. 5 and 10.

In addition, in superimposition processes for these different images, two memories for storing two images, that is, the memory a 211 and the memory b 212, are used only, and superimposition processes for any desired number of images, for example, N images, are realized.

3. Other Embodiments

Next, a description will be given of other embodiments.

(3-1) Embodiment in which Resolution Increase Processing Unit is Set

First, a description will be given, with reference to FIG. 13, of an embodiment in which a resolution increase processing unit is set for a superimposition processing unit.

Figure 13:
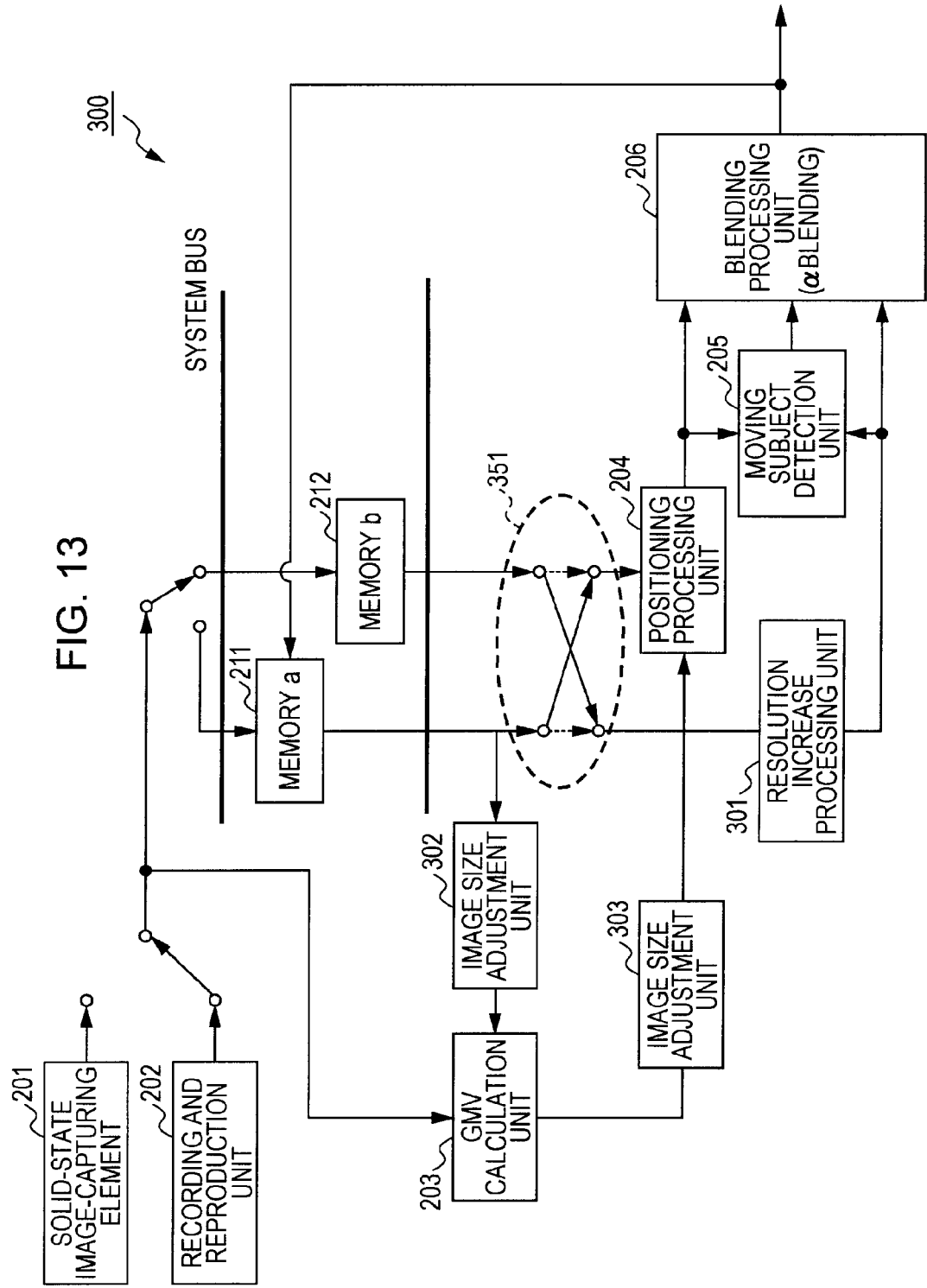
FIG. 13 illustrates the configuration and process of a superimposition processing unit including a resolution increase processing unit.

A superimposition processing unit 300 shown in FIG. 13 is configured in such a manner that a resolution increase processing unit 301 and image size adjustment units 302 and 303 are added to the superimposition processing unit 200 described earlier with reference to FIGS. 5 and 10. The superimposition processing unit 300 is a common circuitry that is used as the superimposition processing unit a 105 and the superimposition processing unit b 108, which are shown in FIG. 1. However, in a case where the superimposition processing unit 300 is used as the superimposition processing unit a 105 for a still image, the connection configuration of the line connection unit 351 is set (the dotted line of the line connection unit 351 in FIG. 13) similarly to that described with reference to FIG. 5. Furthermore, in a case where the superimposition processing unit 300 is used as the superimposition processing unit b 108 for a moving image, the connection configuration of the line connection unit 351 is set (the solid line of the line connection unit 351 in FIG. 13) similarly to that described with reference to FIG. 10.

In addition, regarding an input image, in a case where the superimposition processing unit 300 is used as the superimposition processing unit a 105 for a still image, an input from the solid-state image-capturing element 201 is set, and in a case where the superimposition processing unit 300 is used as the superimposition processing unit b 108 for a moving image, the input is changed to the input structure from the recording and reproduction unit 202. These are realized by, for example, switching between switches that are set in the line connection unit 351, and the connection unit of the solid-state image-capturing element 201 and the recording and reproduction unit 202.

A resolution increase processing unit 301 performs resolution conversion. An up-sampling unit 11 performs resolution conversion by using an expanded image generation technique, such as, for example, a process for setting one pixel to four pixels.

An image size adjustment unit 302 performs a process for making an image input from the memory a 211 match the size of the image input from the recording and reproduction unit 202, for which GMV is to be calculated in the GMV calculation unit 203. This process is performed for the following reason. Since there is a case in which an image is expanded for achieving a higher resolution in the resolution increase processing unit 301, and the size of this expanded image is made to match the size of the input image from the recording and reproduction unit 202, for which GMV is calculated in the GMV calculation unit 203.

An image size adjustment unit 303 also performs a process for adjusting the sizes of two images for the purpose of positioning of images, which is performed at a later process.

The sequence performed in the present embodiment is as follows.

In a process for a RAW image, the process in accordance with the flowchart described earlier with reference to FIG. 3 is a basic process, and a resolution increasing process is performed between step S103 and step S104. In addition, the setting is made such that an image size adjustment process is performed as necessary at a stage preceding each step.

Furthermore, in the process for a full color image, the process in accordance with the flowchart described earlier with reference to FIG. 4 is a basic process, and a resolution increasing process is performed between step S203 and step S204. In addition, setting is made such that an image size adjustment process is performed as necessary at a stage preceding each step.

In the present embodiment, a superimposition process is performed after the resolution of an input frame is increased. As a result, it is possible to reduce jaggy (saw-toothed shape) of edge portions, which occur as a result of expansion. The GMV obtained in the GMV calculation unit 203 is converted into the amount of motion of a high resolution image and is used.

Furthermore, as a modification of the present embodiment, an HPF, such as a Laplacian filter, may be applied to an input frame in order to compensate for blur due to an increase of resolution.

(3-2) Embodiment in which GMV Calculated at the Time of Superimposition Process for RAW Image is Used for Superimposition Process for Full Color Image Next, a description will be given of an embodiment in which GMV calculated at the time of a superimposition process for a RAW image is used for a superimposition process for a full color image.

In the embodiment described earlier, calculation of GMV is successively performed also for a superimposition process for a RAW image. In addition, a GMV calculation process is successively performed also in an superimposition process for a full color image.

However, a full color image is generated from a RAW image, and if the pair of two images for which GMV is to be calculated is the same, GMV calculated from the RAW image and GMV calculated from the full color image should be the same as each other. Therefore, if, for example, GMV calculated in the superimposition process for a RAW image at the time of image capture is recorded as data associated with each image in a memory, when performing a superimposition process for a full color image, it is possible to obtain this GMV data, the processing is simplified without a process for newly calculating GMV, and speed up is achieved.

Figure 14:
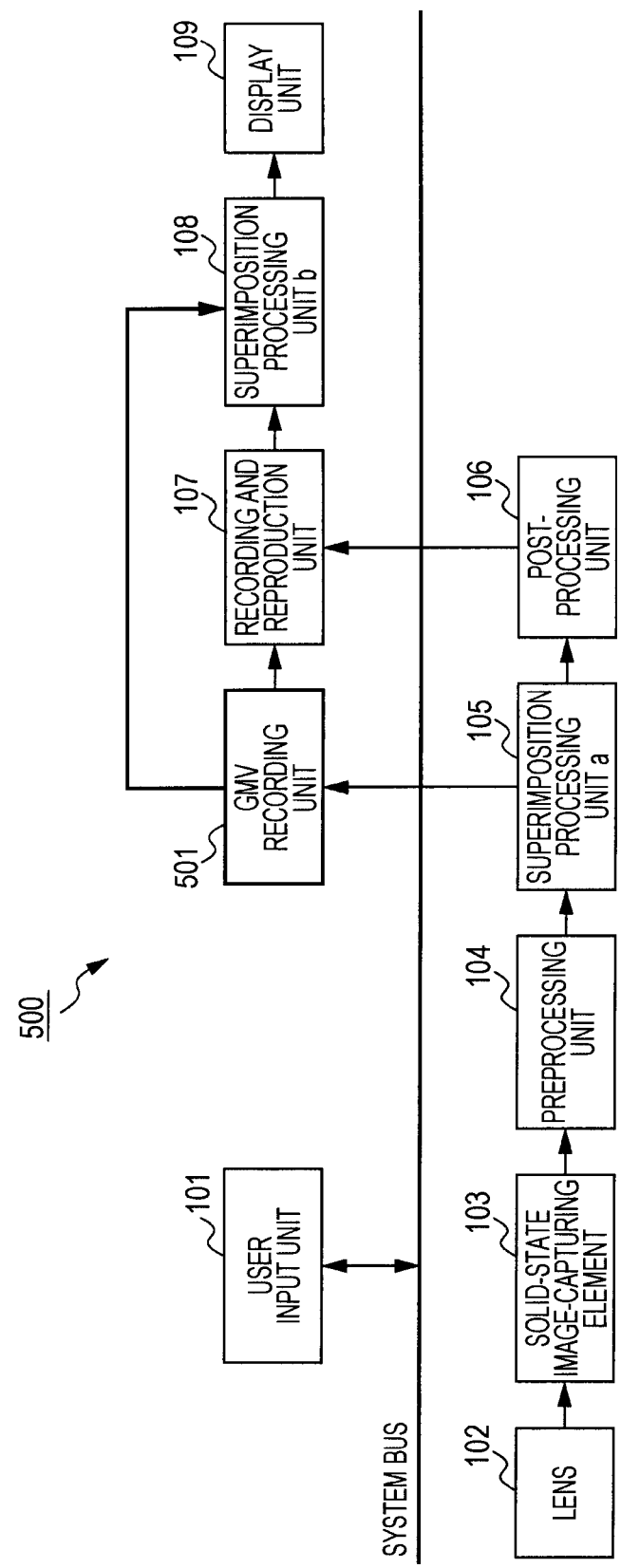
FIG. 14 illustrates the configuration of an image processing apparatus including a GMV recording unit.

FIG. 14 illustrates an example of the configuration of an image processing apparatus for performing the above process.

FIG. 14 illustrates an example of the configuration of an image-capturing device 500, which is an example of the image processing apparatus of an embodiment of the present disclosure. Similarly to the image processing apparatus 100 shown in FIG. 1 described earlier, the image-capturing device 500 performs an image superimposition process for realizing noise reduction or increasing of resolution on a captured RAW image and a full color image that is generated on the basis of the RAW image at the time of image capture.

The superimposition processing unit a 105 of the image-capturing device 500 shown in FIG. 14 performs a superimposition process for a RAW image. A superimposition processing unit b 108 of the image-capturing device 500 shown in FIG. 14 performs a superimposition process for a full color image. These are shown as two blocks, and as described earlier, these are configured using a common circuit.

The difference from the image processing apparatus 100 described with reference to FIG. 1 is that an image processing apparatus 500 shown in FIG. 14 has a GMV recording unit 501.

The GMV recording unit 501 is a storage unit (memory) for recording GMV that is calculated at the time of a RAW image superimposition process performed in the superimposition processing unit a 105. The superimposition processing unit b 108 that performs a superimposition process for a full color image does not perform GMV calculation and uses GMV recorded in the GMV recording unit 501.

In the GMV recording unit 501, the data of GMV is stored in such a manner as to be associated with two items of image frame identifier information, for which GMV has been calculated. The superimposition processing unit b 108 that performs a superimposition process for a full color image selects and uses GMV that is recorded in the GMV recording unit 501 on the basis of the identifier of the pair of images for which GMV is to be calculated.

According to this embodiment, when performing a superimposition process for a full color image, it is possible to obtain this GMV data, it is not necessary to newly calculate GMV, processing is simplified, and speed-up can be achieved. Furthermore, there is an advantage that the use of an image before a codec allows the accuracy of GMV to be improved.

4. Example of Configuration of Hardware of Image Processing Apparatus

Finally, a description will be given, with reference to FIG. 15, of an example of the configuration of one hardware of an image processing apparatus that performs the above-mentioned processing. A central processing unit (CPU) 901 performs various processes in accordance with a program stored in a read only memory (ROM) 902 or a storage unit 908. For example, image processing for the purpose of noise reduction and increasing of resolution by an image superimposition (blending) process described in each of the above-described embodiments is performed. In a random access memory (RAM) 903, a program executed by the CPU 901, data, and the like are stored as appropriate. The CPU 901, the ROM 902, and the RAM 903 are interconnected with one another through a bus 904.

The CPU 901 is connected to an input/output interface 905 through the bus 904. An input unit 906 including a keyboard, a mouse, a microphone, and the like, and an output unit 907 including a display, a speaker, and the like are connected to the input/output interface 905. The CPU 901 performs various processes in response to an instruction input from the input unit 906, and outputs the processing result to, for example, the output unit 907.

The storage unit 908 connected to the input/output interface 905 is formed of, for example, a hard disk, and stores programs executed by the CPU 901 and various data. A communication unit 909 communicates with external devices through a network, such as the Internet and a local area network.

A drive 910 connected to the input/output interface 905 drives a removable medium 911, such as a magnetic disk, an optical disc, a magneto-optical disc, or a semiconductor memory, and obtains programs, data, which are recorded, and the like. The obtained programs and data are transferred to the storage unit 908 and stored as necessary.

The present disclosure has been described above in detail while referring to specific embodiments. However, it is obvious that modifications and substitutions of the embodiments can be made within the spirit and scope of the present disclosure. That is, the present disclosure has been disclosed as exemplary embodiments, and should not be construed as being limited. In order to determine the gist of the present disclosure, the claims should be taken into consideration.

Note that the series of processes described in the specification can be executed by hardware, software, or a combination of both. In the case where the series of processes is to be performed by software, a program recording the processing sequence may be installed in a memory in a computer incorporated in dedicated hardware and executed. Alternatively, the program may be installed on a general-purpose computer capable of performing various processes and executed. For example, the program may be recorded on a recording medium. Note that, besides installing the program from the recording medium to a computer, the program may be installed on a recording medium such as an internal hard disk via a network such as a local area network (LAN) or the Internet.

Note that the various processes described in the specification are not necessarily performed sequentially in the orders described, and may be performed in parallel or individually in accordance with the processing performance or necessity of an apparatus that performs the processes. In addition, the system in the present specification refers to a logical assembly of a plurality of apparatuses and is not limited to an assembly in which apparatuses having individual structures are contained in a single housing.

As has been described above, according to the configuration of an embodiment of the present disclosure, an apparatus and a method that perform an image superimposition process for the purpose of noise reduction or the like in smaller hardware are realized. Specifically, for example, image superimposition for realizing noise reduction and increasing of resolution in a superimposition processing unit that performs a blending process of a plurality of continuously captured images is performed. Data to be stored in a memory for storing two image frames is sequentially updated so as to make image superimposition of any desired number of images possible. An image after a superimposition process is overwritten and stored in a portion of the memory, and the superimposed image stored in the memory is used for the next and subsequent superimposition processes, making image superimposition of any desired number of images possible. Furthermore, by selectively inputting luminance signal information of a RAW image or a full color image as a processing image, it is possible to perform a superimposition process for a RAW image and a full color image using common hardware.

The present disclosure contains subject matter related to that disclosed in Japanese Priority Patent Application JP 2010-138621 filed in the Japan Patent Office on Jun. 17, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a superimposition processing unit configured to perform a blending process for a plurality of continuously captured images,
wherein the superimposition processing unit is configured to selectively input luminance signal information of a RAW image or a full color image as a processing target image and perform a superimposition process, and
performs a process for sequentially updating data that is stored in a memory for storing two image frames so as to enable superimposition of any desired number of images; and
wherein the superimposition processing unit includes:
a global motion vector calculation unit configured to calculate a global motion vector of a plurality of continuously captured images;
a positioning processing unit configured to generate a motion compensated image in which a subject position of a reference image is positioned at a position of a key image in accordance with the global motion vector;
a moving subject detection unit configured to obtain moving subject information on the basis of a pixel difference between corresponding pixels of the motion compensated image obtained as a result of positioning of the positioning processing unit and the key image; and
a blending processing unit configured to blend the key image and the motion compensated image on the basis of the blending ratio based on the moving subject information so as to generate a superimposed image.

2. The image processing apparatus according to claim 1, wherein the superimposition processing unit performs a process for overwriting and storing an image after the superimposition process in a portion of the memory and for using the superimposed image stored in the memory for next and subsequent superimposition processes.

3. The image processing apparatus according to claim 1, wherein the superimposition processing unit stores pixel value data corresponding to each of pixels of the RAW image in the memory and performs a superimposition process based on the pixel value data corresponding to each of pixels of the RAW image in a case where the RAW image is a processing target, and
stores luminance signal value data corresponding to each of pixels in the memory and performs a superimposition process based on luminance value data corresponding to each of pixels of a full color image in a case where the full color image is a processing target.

4. The image processing apparatus according to claim 1, wherein the moving subject detection unit calculates, as moving subject information at a pixel unit, an α value indicating moving subject information on the basis of a pixel difference between corresponding pixels of the motion compensated image obtained as a result of the positioning of the positioning processing unit, and the key image, and wherein the blending processing unit decreases a blending ratio of the motion compensated image with regard to a pixel having a first probability of being a moving subject in accordance with the value of the α value, and performs a blending process in which the blending ratio of the motion compensated image is set high with regard to a pixel having a second probability of being a moving subject, the second probability being lower than the first probability.

5. The image processing apparatus according to claim 4, wherein, when the blending processing unit performs N superimposition processes by using (N+1) still images as processing targets, the blending processing unit performs an N-th superimposition process by using
an (N−1)th superimposed image $mlt_{N-1}$, and
an (N+1)th not-yet-superimposed image $frm_{N+1}$ in accordance with the following equations:

when $N$ is 2 or more,
$$mlt_N = \frac{\alpha}{N+1} \times frm_{N+1} + \left(1 - \frac{\alpha}{N+1}\right) \times mlt_{N-1}, 0 \leq \alpha \leq 1$$
and, when $N$ is 1,
$$mlt_1 = \frac{\alpha}{2} \times frm_2 + \left(1 - \frac{\alpha}{2}\right) \times frm_1, 0 \leq \alpha \leq 1$$

where α denotes moving subject information taking the value of 0 to 1, the moving subject information being a value close to 0 in a motion area and is a value close to 1 in a still area.

6. The image processing apparatus according to claim 4, wherein when the blending processing unit performs N superimposition processes by using (N+1) moving images as processing targets, the blending processing unit performs an N-th superimposition process by using
an (N−1)th superimposed image $mlt_{N-1}$, and
an (N+1)th not-yet-superimposed image $frm_{N+1}$ in accordance with the following equations:

when $N$ is 2 or more,
$$mlt_N = \frac{\alpha}{2} \times mlt_{N-1} + \left(1 - \frac{\alpha}{2}\right) \times frm_{N+1}, 0 \leq \alpha \leq 1$$
and, when $N$ is 1,
$$mlt_1 = \frac{\alpha}{2} \times frm_1 + \left(1 - \frac{\alpha}{2}\right) \times frm_2, 0 \leq \alpha \leq 1$$

where α denotes moving subject information taking a value of 0 to 1, the moving subject information being a value close to 0 in a motion area and close to 1 in a still area.

7. The image processing apparatus according to claim 1, wherein the superimposition processing unit includes a resolution increase processing unit that performs a resolution increasing process for a processing target image, and
wherein the blending processing unit performs superimposition of images whose resolution has been increased in the resolution increase processing unit.

8. The image processing apparatus according to claim 1, further comprising a global motion vector recording unit configured to store a global motion vector of an image, the global motion vector being calculated by the GMV calculation unit on the basis of a RAW image, wherein the superimposition processing unit performs a superimposition process using a full color image as a processing target by using the global motion vector stored in the global motion vector recording unit.

9. An image processing method performed in an image processing apparatus, comprising:
performing a blending process for a plurality of continuously captured images by using a superimposition processing unit,
wherein luminance signal information of a RAW image or a full color image as a processing target image is selectively input so as to perform a superimposition process, and sequentially updating data stored in a memory that stores two image frames so as to enable superimposition of any desired number of images; and
wherein performing the blending process comprises:
calculating a global motion vector of the plurality of continuously captured images;
generating a motion compensated image in which a subject position of a reference image is positioned at a position of a key image in accordance with the global motion vector;
obtaining moving subject information on the basis of a pixel difference between corresponding pixels of the motion compensated image obtained as a result of the positioning and the key image; and
blending the key image and the motion compensated image on the basis of the blending ratio based on the moving subject information so as to generate a superimposed image.

10. A non-transitory computer-readable medium storing a computer program for causing an image processing apparatus to perform image processing, comprising:
causing a superimposition processing unit to perform a blending process for a plurality of continuously captured images,
wherein luminance signal information of a RAW image or a full color image as a processing target image is selectively input so as to perform a superimposition process, and sequentially updating data stored in a memory that stores two image frames so as to enable superimposition of any desired number of images; and
wherein performing the blending process comprises:
calculating a global motion vector of the plurality of continuously captured images;
generating a motion compensated image in which a subject position of a reference image is positioned at a position of a key image in accordance with the global motion vector;
obtaining moving subject information on the basis of a pixel difference between corresponding pixels of the motion compensated image obtained as a result of the positioning and the key image; and
blending the key image and the motion compensated image on the basis of the blending ratio based on the moving subject information so as to generate a superimposed image.

* * * * *